US012787028B2

(12) United States Patent
Matsumura et al.

(10) Patent No.: US 12,787,028 B2
(45) Date of Patent: Nov. 3, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 348 days.

(21) Appl. No.: 18/552,554

(22) PCT Filed: Mar. 31, 2021

(86) PCT No.: PCT/JP2021/013954
§ 371 (c)(1),
(2) Date: Sep. 26, 2023

(87) PCT Pub. No.: WO2022/208779
PCT Pub. Date: Oct. 6, 2022

(65) Prior Publication Data
US 2024/0188098 A1 Jun. 6, 2024

(51) Int. Cl.
*H04W 72/232* (2023.01)
*H04L 1/1812* (2023.01)
(Continued)

(52) U.S. Cl.
CPC ......... *H04W 72/232* (2023.01); *H04L 1/1812* (2013.01); *H04W 72/1273* (2013.01); *H04W 76/20* (2018.02)

(58) Field of Classification Search
CPC ............... H04L 1/1812; H04L 1/1896; H04W 72/1273; H04W 72/232; H04W 76/20
See application file for complete search history.

(56) References Cited

U.S. PATENT DOCUMENTS

| | | | | |
|---|---|---|---|---|
| 11,665,692 B2 * | 5/2023 | Farag | H04W 72/20 370/329 | |
| 2019/0230685 A1 * | 7/2019 | Park | H04L 1/1854 | |

(Continued)

FOREIGN PATENT DOCUMENTS

| | | |
|---|---|---|
| JP | 2024508941 A | 2/2024 |
| WO | 2022188235 A1 | 9/2022 |

OTHER PUBLICATIONS

Office Action issued in Japanese Application No. 2023-510064, mailed Jan. 21, 2025 (6 pages).

(Continued)

*Primary Examiner* — Romani Ohri
(74) *Attorney, Agent, or Firm* — Osha Bergman Watanabe & Burton LLP

(57) ABSTRACT

A terminal according to one aspect of the present disclosure includes a receiving section that receives information indicating a plurality of transmission configuration indication (TCI) states, and receives downlink control information (DCI) indicating one or more TCI states out of the plurality of TCI states, and a control section that determines whether the DCI is DCI not indicating scheduling of a physical downlink shared channel nor a physical uplink shared channel, based on values of a plurality of specific fields included in the DCI, and applies the one or more TCI states to a plurality of types of signals. According to one aspect of the present disclosure, TCI state indication can be appropriately performed.

6 Claims, 15 Drawing Sheets

(51) Int. Cl.
*H04W 72/1273* (2023.01)
*H04W 76/20* (2018.01)

(56) References Cited

U.S. PATENT DOCUMENTS

| | | | | |
|---|---|---|---|---|
| 2020/0280416 | A1* | 9/2020 | Gao | H04L 5/0051 |
| 2022/0248378 | A1* | 8/2022 | Ly | H04L 5/14 |
| 2022/0394751 | A1* | 12/2022 | Myung | H04L 5/00 |
| 2024/0031082 | A1* | 1/2024 | Gao | H04L 1/1854 |
| 2024/0089977 | A1 | 3/2024 | Bai et al. | |

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)"; Mar. 2010 (149 pages).

International Search Report issued in PCT/JP2021/013954 on Oct. 19, 2021 (5 pages).

Written Opinion of the International Searching Authority issued in PCT/JP2021/013954 on Oct. 19, 2021 (4 pages).

* cited by examiner

FIG. 3A

| | **DCI format 0_0/0_1/0_2** | **DCI format 1_0/1_1/1_2** |
|---|---|---|
| HARQ process number | set to all '0's | set to all '0's |
| Redundancy version | set to all '0's | set to all '0's |
| Modulation and coding scheme | set to all '1's | set to all '1's |
| Frequency domain resource assignment | set to all '0's for FDRA Type 2 with $\mu = 1$<br><br>set to all '1's, otherwise | set to all '0's for FDRA Type 0 or for *dynamicSwitch*<br><br>set to all '1's for FDRA Type 1 |

FIG. 3B

| | **DCI format 0_0/0_1/0_2** | **DCI format 1_0/1_1/1_2** |
|---|---|---|
| Redundancy version | set to all '0's | set to all '0's |
| Modulation and coding scheme | set to all '1's | set to all '1's |
| Frequency domain resource assignment | set to all '0's for FDRA Type 2 with $\mu = 1$<br><br>set to all '1's, otherwise | set to all '0's for FDRA Type 0 or for *dynamicSwitch*<br><br>set to all '1's for FDRA Type 1 |

| | DCI format 1_1/1_2 for beam indication without DL assignment |
|---|---|
| CRC scrambling | CS-RNTI |
| RV | Opt.1-1 : Set to all '1' s<br>Opt.1-2 : Set to all '0' s |
| MCS | Opt.2-1 : Set to all '1' s<br>Opt.2-2 : Set to all '0' s |
| NDI | Set to '0' |
| HPN | Unused |
| antenna port(s) | Unused |
| DMRS sequence initialization | Unused |
| FDRA | Set to all '0' s for FDRA Type0<br>Set to all '1' s for FDRA Type1<br>Set to all '0' s for dynamicSwitch |

FIG. 4

| | DCI format 1_1/1_2 for beam indication without DL assignment |
|---|---|
| CRC scrambling | CS-RNTI |
| RV | Opt.1-1 : Set to all '1' s<br>Opt.1-2 : Set to all '0' s |
| MCS | Opt.2-1 : Set to all '1' s<br>Opt.2-2 : Set to all '0' s |
| NDI | Set to '0' |
| HPN | Opt.3-1 : Unused<br>Opt.3-2 : Set to all '0' s for a single DL SPS release<br>Opt.3-3 : Set to all '1' s for a single DL SPS release |
| antenna port(s) | Unused |
| DMRS sequence initialization | Unused |
| FDRA | Set to all '0' s for FDRA Type0<br>Set to all '1' s for FDRA Type1<br>Set to all '0' s for dynamicSwitch |

FIG. 5

JOINT TCI STATE INDICATION (N = M)

| Number of N and M | SIZE OF EACH TCI STATE FIELD |
|---|---|
| 1-2 | 3 bits |
| 3-4 | 2 bits |
| 5- | 1 bit |

SEPARATE TCI STATE INDICATION (N = M)

| Number of N ,M | SIZE OF EACH TCI STATE FIELD |
|---|---|
| 1 | 3 bits |
| 2 | 2 bits |
| 3- | 1 bit |

FIG. 10

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, NR), the following has been under study in which a user terminal (a terminal, a User Equipment (UE)) controls transmission and reception processing based on information (QCL assumption/Transmission Configuration Indication (TCI) state/spatial relation) related to quasi-co-location (QCL).

Application of a configured/activated/indicated TCI state to a plurality of types of signals (channels/RSs) has been under study. However, a method of indicating the TCI state may not be clarified in some cases. Unless the method of indicating the TCI state is clarified, this may lead to deterioration of communication quality, deterioration of throughput, and the like.

In view of this, the present disclosure has one object to provide a terminal, a radio communication method, and a base station for appropriately performing TCI state indication.

Solution to Problem

A terminal according to one aspect of the present disclosure includes a receiving section that receives information indicating a plurality of transmission configuration indication (TCI) states, and receives downlink control information (DCI) indicating one or more TCI states out of the plurality of TCI states, and a control section that determines whether the DCI is DCI not indicating scheduling of a physical downlink shared channel nor a physical uplink shared channel, based on values of a plurality of specific fields included in the DCI, and applies the one or more TCI states to a plurality of types of signals.

Advantageous Effects of Invention

According to one aspect of the present disclosure, TCI state indication can be appropriately performed.

BRIEF DESCRIPTION OF DRAWINGS

FIGS. 3A and 3B are diagrams to show examples of special values for checking activation/release for an SPS PDSCH and UL configured grant type 2.

FIG. 4 is a diagram to show an example of special values for checking a DCI format according to embodiment 1-1.

FIG. 5 is a diagram to show another example of special values for checking a DCI format according to embodiment 1-1.

FIG. 10 is a diagram to show an example of an association for indicating TCI states according to the third embodiment.

Figure 1A:
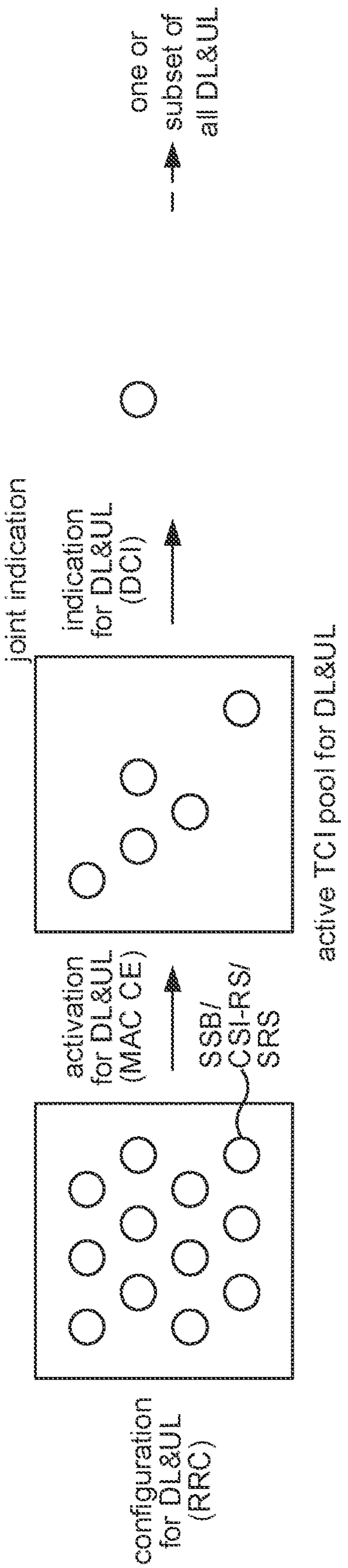
FIGS. 1A and 1B are diagrams to show examples of a common beam.

DESCRIPTION OF EMBODIMENTS (TCI, Spatial Relation, QCL)

For NR, control of reception processing (for example, at least one of reception, demapping, demodulation, and decoding) and transmission processing (for example, at least one of transmission, mapping, precoding, modulation, and coding) in a UE regarding at least one of a signal and a channel (which is referred to as a signal/channel) based on a transmission configuration indication state (TCI state) has been under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter (s) (or parameter set (s)) that can be assumed to be the same, and such parameter (s) (which may be referred to as QCL parameter (s)) are described below:

QCL type A (QCL-A): Doppler shift, Doppler spread, average delay, and delay spread QCL type B (QCL-B): Doppler shift and Doppler spread QCL type C (QCL-C): Doppler shift and average delay QCL type D (QCL-D): Spatial reception parameter A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (that is, a reference signal (RS) for the channel) and another signal (for example, another RS). The TCI state may be configured (indicated) by higher layer signaling or physical layer signaling, or a combination of these.

The physical layer signaling may be, for example, downlink control information (DCI).

A channel for which the TCI state or spatial relation is configured (indicated) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), and a reference signal for QCL detection (also referred to as QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

The RS for QCL type X for the TCI state may mean the RS in the QCL type X relation with (the DMRS for) a certain channel/signal, and the RS may be referred to as a QCL source of the QCL type X for the TCI state.

(Multi-TRP)

In NR, a scheme in which one or a plurality of transmission/reception points (TRPs) (multi-TRP (multi TRP (MTRP))) perform DL transmission to the UE by using one or a plurality of panels (multi-panel) has been under study. In addition, a scheme in which the UE performs UL transmission to one or a plurality of TRPs by using one or a plurality of panels has been under study.

Note that the plurality of TRPs may correspond to the same cell identifier (ID), or may correspond to different cell IDs. The cell ID may be a physical cell ID, or may be a virtual cell ID.

The multi-TRP (for example, TRPs #1 and #2) is connected with an ideal/non-ideal backhaul, and information, data, and the like may be exchanged therebetween. Different code words (CWs) and different layers may be transmitted from each TRP of the multi-TRP. As one mode of multi-TRP transmission, non-coherent joint transmission (NCJT) may be used.

In NCJT, for example, TRP #1 performs modulation mapping of a first code word and performs layer mapping so as to transmit a first PDSCH by using first precoding for a first number of layers (for example, two layers). TRP #2 performs modulation mapping of a second code word and performs layer mapping so as to transmit a second PDSCH by using second precoding for a second number of layers (for example, two layers).

Note that it may be defined that a plurality of PDSCHs (multi-PDSCH) subjected to NCJT partially or entirely overlap in at least one of time and frequency domains. In other words, at least one of the time and frequency resources of the first PDSCH from the first TRP and the second PDSCH from the second TRP may overlap.

It may be assumed that these first PDSCH and second PDSCH are not in a relationship of quasi-co-location (QCL) (not quasi-co-located). Reception of the multi-PDSCH may be interpreted as simultaneous reception of PDSCHs that are not of a certain QCL type (for example, QCL type D).

The plurality of PDSCHs (which may be referred to as multi-PDSCH (multiple PDSCHs) from the multi-TRP may be scheduled using one DCI (single DCI, single PDCCH) (single master mode, multi-TRP based on single DCI (single-DCI based multi-TRP)). The plurality of PDSCHs from the multi-TRP may be scheduled respectively using a plurality of DCIs (multi-DCI, multi-PDCCH (multiple PDCCHs) (multi-master mode, multi-TRP based on multi-DCI (multi-DCI based multi-TRP)).

In URLLC for the multi-TRP, support of PDSCH (transport block (TB) or codeword (CW)) repetition across the multi-TRP has been under study. Support of repetition schemes (URLLC scheme, for example, schemes 1, 2a, 2b, 3, and 4) across the multi-TRP in the frequency domain, the layer (space) domain, or the time domain has been under study. In scheme 1, the multi-PDSCH from the multi-TRP is subjected to space division multiplexing (SDM). In schemes 2a and 2b, the PDSCH from the multi-TRP is subjected to frequency division multiplexing (FDM). In scheme 2a, the redundancy version (RV) is the same for the multi-TRP. In scheme 2b, the RV may be the same or may be different for the multi-TRP. In schemes 3 and 4, the multi-PDSCH from the multi-TRP is subjected to time division multiplexing (TDM). In scheme 3, the multi-PDSCH from the multi-TRP is transmitted in one slot. In scheme 4, the multi-PDSCH from the multi-TRP is transmitted in different slots.

According to the multi-TRP scenario as described above, more flexible transmission control using a channel having satisfactory quality can be performed.

In order to support multi-TRP transmission within a cell ("intra-cell", having the same cell ID) and among cells ("inter-cell", having different cell IDs) based on a plurality of PDCCHs, in RRC configuration information for linking a plurality of pairs of PDCCHs and PDSCHs having a plurality of TRPs, one control resource set (CORESET) in PDCCH configuration information (PDCCH-Config) may correspond to one TRP.

When at least one of the following conditions 1 and 2 is satisfied, the UE may determine the multi-TRP based on the multi-DCI. In this case, the TRP may be interpreted as a CORESET pool index.

[Condition 1]

One CORESET pool index is configured.

[Condition 2]

Two different values (for example, 0 and 1) of the CORESET pool index are configured.

When the following condition is satisfied, the UE may determine the multi-TRP based on the single DCI. In this case, two TRPs may be interpreted as two TCI states indicated by a MAC CE/DCI.

[Condition]

In order to indicate one or two TCI states for one code point of a TCI field in the DCI, "Enhanced TCI States Activation/Deactivation for UE-specific PDSCH MAC CE" is used.

The DCI for common beam indication may be a UE-specific DCI format (for example, a DL DCI format (for example, 1_1, 1_2), a UL DCI format (for example, 0_1, 0_2)), or may be a UE-group common DCI format.

(Simultaneous Beam Update in Plurality of CCs)

In Rel. 16, one MAC CE can update beam indexes (TCI states) of a plurality of CCs.

The UE can be configured with up to two applicable CC lists (for example, applicable-CC-list) by RRC. When two applicable CC lists are configured, the two applicable CC lists may respectively correspond to intra-band CA in FR1 and intra-band CA in FR2.

An activation MAC CE of a TCI state of a PDCCH activates a TCI state associated with the same CORESET ID in all of the BWPs/CCs in the applicable CC list.

An activation MAC CE of a TCI state of a PDSCH activates a TCI state in all of the BWPs/CCs in the applicable CC list.

An activation MAC CE of spatial relation of an A-SRS/SP-SRS activates spatial relation associated with the same SRS resource ID in all of the BWPs/CCs in the applicable CC list.

For example, the UE is configured with the applicable CC list indicating CCs #0, #1, #2, and #3 and a list indicating 64 TCI states for the CORESET or the PDSCH of each of the CCs. When one TCI state of CC #0 is activated by the MAC CE, corresponding TCI states are activated in CCs #1, #2, and #3.

A scheme in which such simultaneous beam update can be applied only to a single TRP case has been under study.

For the PDSCH, the UE may be based on the following procedure A.

[Procedure A]

The UE receives an activation command for mapping up to eight TCI states to code points of a DCI field (TCI field) in one CC/DL BWP or in one set of CCs/BWPs. When one set of TCI state IDs is activated for one set of CCs/DL BWPs, a CC applicable list is then determined by the CCs indicated in the activation command, and the same set of TCI states is applied to all of the DL BWPs in the indicated CCs. Only if the UE is not provided with a plurality of different values of CORESET pool indexes (CORESETPoolIndex) in a CORESET information element (ControlResourceSet), and is not provided with at least one TCI code point to be mapped to two TCI states, one set of TCI state IDs can be activated for one set of CCs/DL BWPs.

For the PDCCH, the UE may be based on the following procedure B.

[Procedure B]

If the UE is provided with up to two lists of cells for simultaneous TCI state activation using a simultaneous TCI update list (at least one of simultaneousTCI-UpdateList-r16 and simultaneousTCI-UpdateListSecond-r16) by a simultaneous TCI cell list (simultaneousTCI-CellList), the UE applies antenna port quasi co-location (QCL) provided by the TCI states having the same activated TCI state ID value to the CORESET having an index p in all of configured DL BWPs in all of configured cells in one list determined based on a serving cell index provided by a MAC CE command. Only if the UE is not provided with a plurality of different values of CORESET pool indexes (CORESETPoolIndex) in the CORESET information element (ControlResourceSet), and is not provided with at least one TCI code point to be mapped to two TCI states, the simultaneous TCI cell list can be provided for simultaneous TCI state activation.

For a semi-persistent (SP)/aperiodic (AP)-SRS, the UE may be based on the following procedure C.

[Procedure C]

When spatial relation information (spatialRelationInfo) for SP or AP-SRS resources configured by an SRS resource information element (higher layer parameter SRS-Resource) is activated/updated for one set of CCs/BWPs by the MAC CE, the CC applicable list is then indicated by a simultaneous spatial update list (higher layer parameter simultaneousSpatial-UpdateList-r16 or simultaneousSpatial-UpdateListSecond-r16), and the spatial relation information is applied to the SP or AP-SRS resources having the same SRS resources ID in all of BWPs in the indicated CCs. Only if the UE is not provided with a plurality of different values of CORESET pool indexes (CORESETPoolIndex) in the CORESET information element (ControlResourceSet), and is not provided with at least one TCI code point to be mapped to two TCI states, the spatial relation information (spatialRelationInfo) for the SP or AP-SRS resources configured by the SRS resource information element (higher layer parameter SRS-Resource) is activated/updated for one set of CCs/BWPs by the MAC CE.

The simultaneous TCI cell list (simultaneousTCI-CellList) and the simultaneous TCI update list (at least one of simultaneousTCI-UpdateList1-r16 and simultaneousTCI-UpdateList2-r16) are lists of serving cells with which a TCI relationship can be simultaneously updated using the MAC CE. simultaneousTCI-UpdateList1-r16 and simultaneousTCI-UpdateList2-r16 do not include the same serving cell.

The simultaneous spatial update list (at least one of higher layer parameters simultaneousSpatial-UpdatedList1-r16 and simultaneousSpatial-UpdatedList2-r16) is a list of serving cells with which the spatial relation can be simultaneously updated using the MAC CE. simultaneousSpatial-UpdatedList1-r16 and simultaneousSpatial-UpdatedList2-r16 do not include the same serving cell.

Here, the simultaneous TCI update list and the simultaneous spatial update list are configured by RRC, the CORESET pool index of the CORESET is configured by RRC, and the TCI code point to be mapped to the TCI state is indicated by the MAC CE.

(Unified/Common TCI Framework)

According to a unified TCI framework, channels of the UL and the DL can be controlled by a common framework. In the unified TCI framework, a common beam (common TCI state) may be indicated and applied to all of the channels of the UL and the DL, or a common beam for the UL may be applied to all of the channels of the UL and a common beam for the DL may be applied to all of the channels of the DL, unlike Rel. 15 in which the TCI state or the spatial relation is defined for each channel.

One common beam for both of the DL and the UL, or a common beam for the DL and a common beam for the UL (two common beams in total) have been under study.

The UE may assume the same TCI state (a joint TCI state, a joint TCI pool, a joint common TCI pool) for the UL and the DL. The UE may assume different TCI states (a separate TCI state, a separate TCI pool, a UL separate TCI pool and a DL separate TCI pool, a separate common TCI pool, a UL common TCI pool and a DL common TCI pool) respectively for the UL and the DL.

Default beams of the UL and the DL may be unified using beam management based on a MAC CE (MAC CE level beam indication). The default beams may be unified with a default UL beam (spatial relation) by updating a default TCI state of the PDSCH.

The common beam/unified TCI state may be indicated from the same TCI pool for both of the UL and the DL (a joint common TCI pool, a joint TCI pool, a set), using beam management based on DCI (DCI level beam indication). M (>1) TCI states may be activated by the MAC CE. The UL/DL DCI may select one from M active TCI states. The selected TCI state may be applied to the channels/RSs of both of the UL and the DL.

The TCI pool (set) may be a plurality of TCI states configured by an RRC parameter, or may be a plurality of TCI states (active TCI states, an active TCI pool, a set) activated by the MAC CE out of the plurality of TCI states configured by the RRC parameter. Each TCI state may be a QCL type A/D RS. As the QCL type A/D RS, an SSB, a CSI-RS, or an SRS may be configured.

In the example of FIG. 1A, the RRC parameter (information element) configures a plurality of TCI states for both of the DL and the UL. The MAC CE may activate a plurality of TCI states out of the plurality of configured TCI states. The DCI may indicate one of the plurality of activated TCI states. The DCI may be UL/DL DCI. The indicated TCI state may be applied to at least one (or all) of the channels/RSs of the UL/DL. One DCI may indicate both of a UL TCI and a DL TCI.

In the example of FIG. 1A, one point may be one TCI state applied to both of the UL and the DL, or may be two TCI states respectively applied to the UL and the DL.

At least one of a plurality of TCI states configured by the RRC parameter and the plurality of TCI states activated by the MAC CE may be referred to as a TCI pool (a common TCI pool, a joint TCI pool, a TCI state pool). The plurality of TCI states activated by the MAC CE may be referred to as an active TCI pool (active common TCI pool).

Figure 1B:
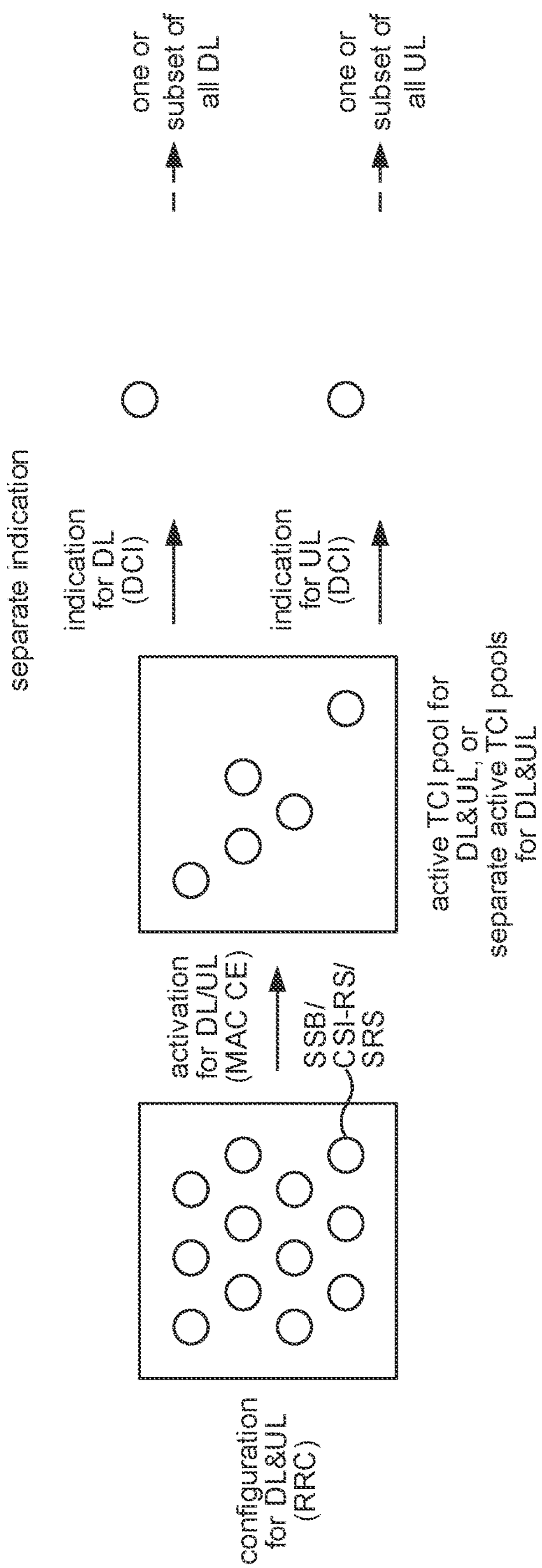

In the example of FIG. 1B, the RRC parameter configures a plurality of TCI states (joint common TCI pool) for both of the DL and the UL. The MAC CE may activate a plurality of TCI states (active TCI pool) out of the plurality of configured TCI states. (Separate) active TCI pools respectively for the UL and the DL may be configured/activated.

The DL DCI or a new DCI format may select (indicate) one or more (for example, one) TCI state(s). The selected TCI state may be applied to one or more (or all) of the channels/RSs of the DL. The DL channel may be a PDCCH/PDSCH/CSI-RS. The UE may determine the TCI state of each channel/RS of the DL, using an operation (TCI framework) of the TCI state of Rel. 16. The UL DCI or a new DCI format may select (indicate) one or more (for example, one) TCI state (s). The selected TCI state may be applied to one or more (or all) of the UL channels/RSs. The UL channel may be a PUSCH/SRS/PUCCH. In this manner, different DCIs may separately indicate the UL TCI and the DL DCI.

Existing DCI format 1_1/1_2 may be used for indication of the common TCI state.

The common TCI framework may include separate TCI states for the DL and the UL.

The common TCI framework may include separate TCI states for the DL and the UL. It is not preferable to indicate the common TCI state of only the UL, using DCI format 1_1/1_2.

(SPS PDSCH)

In NR, transmission and reception based on semi-persistent scheduling (SPS) is used. In the present disclosure, SPS may be interchangeably interpreted as downlink SPS (DL SPS).

The UE may activate or deactivate (release) SPS configuration, based on a downlink control channel (Physical Downlink Control Channel (PDCCH)). The UE may perform reception of a corresponding SPS downlink shared channel (Physical Downlink Shared Channel (PDSCH)), based on activated SPS configuration.

Note that, in the present disclosure, the PDCCH may be interpreted as downlink control information (DCI) transmitted using the PDCCH, or simply as DCI or the like. In the present disclosure, SPS, an SPS PDSCH, SPS configuration, an SPS occasion, SPS reception, SPS PDSCH reception, SPS scheduling, and the like may be interchangeably interpreted as each other.

The DCI for activating or deactivating (releasing) the SPS configuration may be referred to as activation DCI (or SPS assignment DCI), deactivation DCI, or the like. The deactivation DCI may be referred to as release DCI, or simply as release or the like.

The DCI may include cyclic redundancy check (CRC) bits scrambled with a specific RNTI (for example, a configured scheduling radio network temporary identifier (CS-RNTI)).

The DCI may be a DCI format for PUSCH scheduling (DCI format 0_0, 0_1, or the like), a DCI format for PDSCH scheduling (DCI format 1_0, 1_1, or the like), or the like. The DCI in which a plurality of fields indicate a certain bit sequence may indicate SPS activation DCI or SPS release DCI.

The SPS configuration (which may be referred to as configuration information related to SPS) may be configured for the UE, using higher layer signaling.

The configuration information related to SPS (for example, an "SPS-Config" information element of RRC) may include an index for identifying SPS (which may be referred to as an SPS index, or an SPS configuration index, or the like), information related to resources of SPS (for example, periodicity of SPS), information related to PUCCH resources for SPS, or the like.

The UE may determine a length, a start symbol, or the like of SPS, based on a time domain assignment field of the SPS activation DCI.

SPS may be configured for a special cell (SpCell) (for example, a primary cell (PCell) or a primary secondary cell (PSCell)), or may be configured for a secondary cell (SCell).

In Rel-16 NR, the UE may be provided with a plurality of SPS configurations. In this case, the UE may activate/deactivate the plurality of SPS configurations, using one activation/release DCI.

The DCI separately indicating release for each SPS configuration is referred to as separate release DCI. The DCI collectively indicating release of the plurality of SPS configurations is referred to as joint release DCI.

In Rel-16 NR, the SPS configuration (for example, SPS-Config) notified using higher layer signaling may include at least one of the following:

- information (for example, periodicity) indicating periodicity,
- information (for example, nrofHARQ-Processes) indicating the number of HARQ processes,
- information (for example, n1PUCCH-AN) related to resources (for example, PUCCH resources) for an uplink control channel (for example, a Physical Uplink Control Channel) used for transmission of an HARQ-ACK,
- table information (for example, an MCS table (mcs-Table)) used for determination of a modulation and coding scheme (MCS),
- information (for example, an SPS configuration index, sps-ConfigIndex, sps-ConfigIndex-r16) indicating one of a plurality of DL SPS configurations in one BWP,
- information (for example, harq-ProcID-Offset, harq-ProcID-Offset-r16) related to an offset used for generating an HARQ process ID,
- information (for example, periodicityExt, periodicityExt-r16) for calculating periodicity of the SPS PDSCH,
- information (for example, harq-CodebookID, harq-CodebookID-r16) indicating an HARQ-ACK codebook corresponding to an HARQ-ACK for the SPS PDSCH and an ACK for SPS PDSCH release,
- information (for example, pdsch-AggregationFactor, pdsch-AggregationFactor-r16) indicating the number of repetitions of the SPS PDSCH.

At least one of the activation DCI and the release DCI of SPS may include information of at least one of the following.

- information (time domain resource assignment (TDRA)) related to assignment of time domain resources (for example, one or more symbols)
- information (frequency domain resource assignment (FDRA)) related to assignment of frequency domain resources (for example, one or more physical resource blocks (PRBs) (also referred to as resource blocks (RBs)))
- information (for example, an MCS index) related to the MCS
- information (for example, an HARQ process number (HPN), an HARQ process ID) indicating the HARQ process
- information (for example, a redundancy version (RV)) indicating the redundancy version
- information (for example, a DL assignment index (Downlink assignment index)) related to DL assignment
- information (for example, a PUCCH resource indicator) related to PUCCH resources
- information (for example, a PDSCH-HARQ-ACK feedback timing indicator (PDSCH-to-HARQ feedback timing indicator)) related to timing of feedback (transmission) of an HARQ-ACK
- information (for example, a carrier indicator (CI)) related to a carrier
- information (for example, a bandwidth part indicator (BI)) related to a bandwidth part (BWP)
- a new data indicator (NDI)

Figure 2:
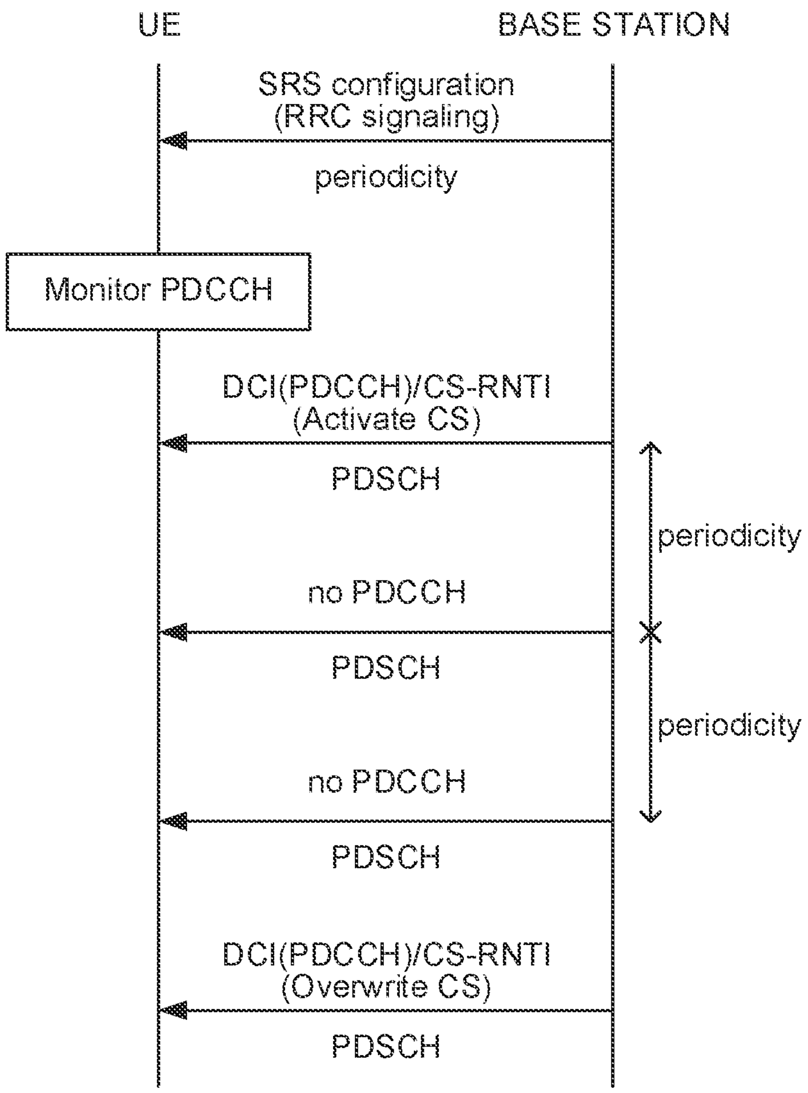
FIG. 2 is a diagram to show an example of an SPS PDSCH procedure.

In the example of FIG. 2, the UE receives the SPS configuration, using RRC signaling. The SPS configuration includes periodicity of the SPS PDSCH. The UE monitors the PDCCH. When the UE receives activation DCI of configured scheduling (CS), the UE receives the PDSCH. The activation DCI includes a CRC scrambled with a CS-RNTI. Subsequently, the UE receives the PDSCH without the PDCCH in accordance with the configured periodicity. The UE may receive activation DCI for overwriting the configured scheduling (CS).

If the UE receives the PDSCH without reception of a corresponding PDCCH, or if the UE receives the PDCCH indicating SPS PDSCH release, the UE generates one corresponding HARQ-ACK information bit. If the UE receives the PDCCH indicating SPS PDSCH release, the UE generates one corresponding HARQ-ACK information bit even if the UE does not receive the PDSCH.

A study has been conducted on a case in which HARQ-ACK feedback for the SPS PDSCH and HARQ-ACK feedback for a dynamic PDSCH are multiplexed on one PUCCH.

A study has been conducted on implementation of at least one of the following derivation methods 1-1 to 1-3 in a case in which HARQ-ACK feedback for one or more SPS PDSCH receptions without a corresponding PDCCH is multiplexed on HARQ-ACK feedback for at least one of a dynamically scheduled PDSCH and SPS PDSCH release, a case in which HARQ-ACK feedback for at least one of SPS PDSCH release and HARQ-ACK feedback for a dynamically scheduled PDSCH are multiplexed, or a case in which only HARQ-ACK feedback for the SPS PDSCH is reported, for a type 1 (semi-static) HARQ-ACK codebook.

[Derivation Method 1-1]

HARQ-ACK bit positions for SPS PDSCH reception are derived through reuse of the systems of Rel. 15 (based on a row index and K1 of a TDRA table indicated by the activation DCI).

[Derivation Method 1-2]

HARQ-ACK bit positions for SPS PDSCH release including the separate release DCI are derived through reuse of the systems of Rel. 15 (based on the row index of the TDRA table (a value of a TDRA field) indicated by the activation DCI and K1 (a value of a PDSCH-to-HARQ feedback indicator field) indicated by the release DCI).

[Derivation Method 1-3]

HARQ-ACK bit positions for SPS PDSCH release including the joint release DCI are derived based on the row index of the TDRA table indicated by the activation DCI for the SPS PDSCH having the lowest SPS configuration index out of the SPS configurations to be collectively released and the row index and K1 of the TDRA table indicated by the release DCI.

In this manner, for the type 1 HARQ-ACK codebook, a study has been conducted on a scheme in which the HARQ-ACK bit positions for the SPS PDSCH are based on the TDRA index and K1 in the activation DCI and the HARQ-ACK bit positions for the SPS separate release DCI/SPS joint release DCI are based on the TDRA index in the activation DCI (for the lowest SPS configuration index) and K1 in the release.

A study has been conducted on implementation of at least one of the following derivation methods 2-1 to 2-3 for a type 2 (dynamic) HARQ-ACK codebook.

[Derivation Method 2-1]

HARQ-ACK bit order for SPS PDSCH release with the separate release DCI/joint release DCI is derived through reuse of the systems of Rel. 15 (based on a downlink assignment index (DAI) and K1 indicated by the release DCI).

[Derivation Method 2-2]

HARQ-ACK bit order for the SPS PDSCH with an associated PDCCH is derived through reuse of the systems of Rel. 15 (based on a DAI and K1 indicated by the activation DCI).

[Derivation Method 2-3]

In a case in which HARQ-ACK feedback for one or more SPS PDSCH receptions without a corresponding PDCCH is multiplexed on HARQ-ACK feedback for at least one of a dynamically scheduled PDSCH and SPS PDSCH release, the HARQ-ACK bits for one or more SPS PDSCH receptions without a corresponding PDCCH are added after HARQ-ACK bits for at least one of a dynamically scheduled PDSCH and SPS PDSCH release. The order of HARQ-ACK bits to be added may be firstly ascending order of a DL slot for each combination of the SPS configuration index and the serving cell index {SPS configuration index, serving cell index}, secondly ascending order of the SPS configuration index for each serving cell index, and thirdly ascending order of the serving cell index.

In this manner, for the type 2 HARQ-ACK codebook, the HARQ-ACK bit order for the SPS PDSCH is based on the DAI and K1 in the activation DCI. A study has been conducted on a scheme in which the HARQ-ACK bit order for the SPS separate release DCI/SPS joint release DCI is based on the DAI and K1 in the release DCI.

For scheduling activation, scheduling release, a DL SPS assignment PDCCH, or a configured UL grant type 2 PDCCH, the UE checks the following states 1 to 4.

[State 1] A CRC of a corresponding DCI format is scrambled using a CS-RNTI provided by a cs-RNTI.

[State 2] A new data indicator field in the DCI format for an enabled transport block is set to '0'.

[State 3] If there is a DFI flag in the DCI format, a DFI flag field is set to '0'.

[State 4] If the checking is for scheduling activation and there is a PDSCH-to-HARQ timing indicator field in the DCI format, the PDSCH-to-HARQ timing indicator field is a not-applicable value from dl-DataToUL-ACK.

If the UE is provided with a single configuration for a UL grant type 2 PUSCH or an SPS PDSCH and all of the fields of the DCI format are set in accordance with a table of a specification (for example, FIG. 3A), checking of the DCI format is achieved.

If the UE is provided with one or more configurations for the UL grant type 2 PUSCH or the SPS PDSCH, the following procedures 1 and 2 are implemented.

[Procedure 1]

If the UE is provided with Type2Configuredgrantconfig-ReleaseStateList or SPS-ReleaseStateList, a value of an HARQ process number field in the DCI format indicates a corresponding entry in scheduling release of one or more UL grant type 2 PUSCH or SPS PDSCH configurations.

[Procedure 2]

If the UE is not provided with Type2Configuredgrantconfig-ReleaseStateList or SPS-ReleaseStateList, the value of the HARQ process number field in the DCI format indicates release for the UL grant type 2 PUSCH or SPS PDSCH configuration corresponding to the same value as the value provided by Configuredgrantconfig-index or SPSconfig-index.

When all of the fields in the DCI format are set in accordance with a table of a specification (for example, FIG. 3B), checking of the DCI format is achieved. If the checking is achieved, the UE considers that information in the DCI format is effective activation or effective release for DL SPS or configuration UL grant type 2. If the checking is not achieved, the UE discards the information in the DCI format.

For SPS PDSCH release, special values (for example, FIGS. 3A and 3B) of special fields (a new data indicator (NDI), downlink feedback information (DFI), a redundancy version (RV), a modulation and coding scheme (MCS), a frequency domain resource assignment (FDRA), an HARQ process number (HPN)) are reused for SPS configuration index indication (checking).

The UE assumes to provide the HARQ-ACK information according to the SPS PDSCH after N symbols have passed since the last symbol of the PDCCH for providing SPS PDSCH release. If processingType2Enabled of PDSCH-ServingCellConfig is set to enabled for the serving cell including the PDCCH for providing SPS PDSCH release, N=5 for $\mu$=0, N=5.5 for $\mu$=1, and N=11 for $\mu$=2, otherwise N=10 for $\mu$=0, N=12 for $\mu$=1, N=22 for $\mu$=2, and N=25 for $\mu$=3. Here, u corresponds to the smallest SCS configuration between the SCS configuration of the PDCCH for providing SPS PDSCH release and the SCS configuration of the PUCCH for carrying the HARQ-ACK information according to SPS PDSCH release.

In this manner, the HARQ-ACK for SPS PDSCH release is implemented after N symbols have passed since the PDCCH.

(Analysis)

Incidentally, using at least one of a DCI format with DL assignment (for example, DCI format 1_1/1_2) and a DCI format without DL assignment (for example, DCI format 1_1/1_2) for beam indication DCI for the common/unified TCI state in Rel. 17 or later versions has been under study. Using DCI format 1_1/1_2 without DL assignment is beneficial when indication of the common/unified TCI state is performed in a situation where there is no DL data in particular.

Note that the DCI for scheduling the PDSCH may be referred to as a DL assignment, DL DCI, or the like, and the DCI for scheduling the PUSCH may be referred to as a UL grant, UL DCI, or the like. Note that the PDSCH may be interpreted as DL data, and the PUSCH may be interpreted as UL data.

However, studies have not been fully conducted on a method of implementing a DCI format with DL assignment (for example, DCI 1 format 1_1/1_2). Specifically, studies have not been fully conducted on a method of distinguishing between the DCI format without DL assignment and other DCI formats, a method of generating an HARQ-ACK codebook for the DCI format without DL assignment, a TCI state field in the DCI format without DL assignment, and the like. Unless these studies are fully conducted, this may lead to deterioration of communication quality, deterioration of throughput, and the like.

In view of this, the inventors of the present invention came up with the idea of a method of implementing a DCI format without DL assignment.

Embodiments according to the present disclosure will be described in detail with reference to the drawings as follows. The radio communication methods according to respective embodiments may each be employed individually, or may be employed in combination.

In the present disclosure, "A/B/C" and "at least one of A, B, and C" may be interchangeably interpreted as each other. In the present disclosure, a cell, a serving cell, a CC, a carrier, a BWP, a DL BWP, a UL BWP, an active DL BWP, an active UL BWP, and a band may be interchangeably interpreted as each other. In the present disclosure, an index, an ID, an indicator, and a resource ID may be interchangeably interpreted as each other. In the present disclosure, to support, to control, to be able to control, to operate, and to be able to operate may be interchangeably interpreted as each other.

In the present disclosure, configure, activate, update, indicate, enable, specify, and select may be interchangeably interpreted as each other.

In the present disclosure, a MAC CE and an activation/deactivation command may be interchangeably interpreted as each other.

In the present disclosure, the higher layer signaling may be, for example, any one of Radio Resource Control (RRC) signaling, Medium Access Control (MAC) signaling, broadcast information, and the like, or a combination of these. In the present disclosure, RRC, RRC signaling, an RRC parameter, a higher layer, a higher layer parameter, an RRC information element (IE), and an RRC message may be interchangeably interpreted as each other.

As the MAC signaling, for example, a MAC control element (MAC CE), a MAC Protocol Data Unit (PDU), or the like may be used. The broadcast information may be, for example, a master information block (MIB), a system information block (SIB), minimum system information (Remaining Minimum System Information (RMSI)), other system information (OSI), or the like.

In the present disclosure, a beam, a spatial domain filter, a space setting, a TCI state, a UL TCI state, a unified TCI state, a unified beam, a common TCI state, a common beam, a TCI assumption, a QCL assumption, a QCL parameter, a spatial domain reception filter, a UE spatial domain reception filter, a UE receive beam, a DL beam, a DL receive beam, DL precoding, a DL precoder, a DL-RS, an RS of QCL type D of a TCI state/QCL assumption, an RS of QCL type A of a TCI state/QCL assumption, spatial relation, a spatial domain transmission filter, a UE spatial domain transmission filter, a UE transmit beam, a UL beam, a UL transmit beam, UL precoding, a UL precoder, and a PL-RS may be interchangeably interpreted as each other. In the present disclosure, a QCL type X-RS, a DL-RS associated with QCL type X, a DL-RS having QCL type X, a source of a DL-RS, an SSB, a CSI-RS, and an SRS may be interchangeably interpreted as each other.

UL DCI, DCI for scheduling a UL channel (for example, a PUSCH), and DCI format 0_x (x=0, 1, 2, . . . ) may be interchangeably interpreted as each other. DL DCI, DCI for scheduling a DL channel (PDSCH), and DCI format 1_x (x=0, 1, 2, . . . ) may be interchangeably interpreted as each other.

In the present disclosure, HARQ-ACK information, an ACK, and a NACK may be interchangeably interpreted as each other.

In the present disclosure, a link direction, a downlink (DL), an uplink (UL), and one of the UL and the DL may be interchangeably interpreted as each other.

In the present disclosure, a pool, a set, a group, and a list may be interchangeably interpreted as each other.

In the present disclosure, a common beam, a common TCI, a common TCI state, a unified TCI, a unified TCI state, a TCI state that can be applied to the DL and the UL, a TCI state that is applied to a plurality (a plurality of types) of channels/RSs, a TCI state that can be applied to a plurality of types of channels/RSs, and a PL-RS may be interchangeably interpreted as each other.

In the present disclosure, a plurality of TCI states configured by RRC, a plurality of TCI states activated by a MAC CE, a pool, a TCI state pool, an active TCI state pool, a common TCI state pool, a joint TCI state pool, a separate TCI state pool, a UL common TCI state pool, a DL common TCI state pool, a common TCI state pool configured/activated by RRC/MAC CE, and TCI state information may be interchangeably interpreted as each other.

In the present disclosure, a panel, an Uplink (UL) transmission entity, a point, a TRP, a spatial relation, a control resource set (CORESET), a PDSCH, a code word, a base station, an antenna port of a certain signal (for example, a demodulation reference signal (DMRS) port), an antenna port group of a certain signal (for example, a DMRS port group), a group for multiplexing (for example, a code division multiplexing (CDM) group, a reference signal group, a CORESET group), a CORESET pool, a CORESET subset, a CW, a redundancy version (RV), and a layer (a MIMO layer, a transmission layer, a spatial layer) may be interchangeably interpreted as each other. A panel Identifier (ID) and a panel may be interchangeably interpreted as each other. In the present disclosure, a TRP index, a TRP ID, a CORESET pool index, ordinal numbers (first and second) of TCI states in two TCI states, and a TRP may be interchangeably interpreted as each other.

In the present disclosure, a TRP, a transmission point, a panel, a DMRS port group, a CORESET pool, and one of two TCI states associated with one code point of a TCI field may be interchangeably interpreted as each other.

In the present disclosure, a single TRP, a single TRP system, a single TRP transmission, and a single PDSCH may be interchangeably interpreted as each other. In the present disclosure, a multi-TRP, a multi-TRP system, multi-TRP transmission, and a multi-PDSCH may be interchangeably interpreted as each other. In the present disclosure, a single DCI, a single PDCCH, a multi-TRP based on single DCI, and activation of two TCI states in at least one TCI code point may be interchangeably interpreted as each other.

In the present disclosure, a single TRP, a channel using a single TRP, a channel using one TCI state/spatial relation, no enabling of a multi-TRP by RRC/DCI, no enabling of a plurality of TCI states/spatial relations by RRC/DCI, and no configuration of one CORESET pool index (CORESETPoolIndex) value for any of the CORESETs and no mapping of any code point of a TCI field to two TCI states may be interchangeably interpreted as each other.

In the present disclosure, a multi-TRP, a channel using a multi-TRP, a channel using a plurality of TCI states/spatial relations, enabling of a multi-TRP by RRC/DCI, enabling of a plurality of TCI states/spatial relations by RRC/DCI, and at least one of a multi-TRP based on single DCI and a multi-TRP based on multi-DCI may be interchangeably interpreted as each other.

In the present disclosure, a multi-TRP based on multi-DCI, a multi-DCI based multi-TRP, configuration of one CORESET pool index (CORESETPoolIndex) value for the CORESET, and configuration of the CORESET pool index for one or more CORESETs and configuration of a different CORESET pool index=0 or 1 for the CORESET may be interchangeably interpreted as each other.

In the present disclosure, a multi-TRP based on single DCI, a single DCI based multi-TRP, mapping of at least one code point of a TCI field to two TCI states, no configuration of the CORESET pool index for the CORESET, and configuration of the same CORESET pool index for all of the CORESETs may be interchangeably interpreted as each other.

In the present disclosure, TRP 1 (first TRP) may correspond to CORESET pool index=0, or may correspond to a first TCI state of two TCI states corresponding to one code point of a TCI field. TRP 2 (second TRP) may correspond to CORESET pool index=1, or may correspond to a second TCI state of the two TCI states corresponding to one code point of the TCI field.

In the present disclosure, a CC list, a serving cell list, a CC list in a cell group configuration (CellGroupConfig), an applicable list, a simultaneous TCI update list/second simultaneous TCI update list, simultaneousTCI-UpdateList1-r16/simultaneousTCI-UpdateList2-r16, a simultaneous TCI cell list, simultaneousTCI-CellList, a simultaneous spatial update list/second simultaneous spatial update list, simultaneousSpatial-UpdatedList1-r16/simultaneousSpatial-UpdatedList2-r16, a configured CC, a configured list, a BWP/CC in a configured list, all of the BWPs/CCs in a configured list, a CC indicated by an activation command, an indicated CC, a CC in which a MAC CE is received, and information indicating a plurality of cells for update of at least one of a TCI state and a spatial relation may be interchangeably interpreted as each other.

(Radio Communication Method)

In the present disclosure, joint beam indication, common beam indication, and beam indication for the UL and the DL may be interchangeably interpreted as each other.

In the present disclosure, separate beam indication, common beam indication for the UL or the DL, beam indication for the UL or the DL, UL beam indication, and DL beam indication may be interchangeably interpreted as each other.

The UE may receive information (RRC information element/MAC CE) indicating a plurality of TCI states, and receive DCI (beam indication DCI, an existing DCI format (for example, DCI format 1_1/1_2)) indicating one or more TCI states out of the plurality of TCI states and scheduling of one of the PDSCH and the PUSCH. In the present disclosure, the DCI format indicating scheduling of the PDSCH may be referred to as a DCI format with DL assignment.

The UE may receive information (RRC information element/MAC CE) indicating a plurality of TCI states, and receive DCI (beam indication DCI) indicating one or more TCI states out of the plurality of TCI states and not indicating scheduling of the PDSCH or the PUSCH.

In the present disclosure, DCI (DCI format) not indicating scheduling of the PDSCH or the PUSCH, DCI (DCI format) not indicating scheduling of the PDSCH, DCI (DCI format) without DL assignment, DCI (DCI format) being a DCI format for DL assignment and not scheduling the PDSCH, DCI (DCI format) being a DCI format including a field for DL assignment and not scheduling the PDSCH, and DCI (DCI format) including a TCI state field and not scheduling the PDSCH may be interchangeably interpreted as each other. The DCI format without DL assignment may be DCI format 1_1/1_2, for example.

The UE may receive information (RRC information element/MAC CE) indicating a plurality of TCI states, and receive DCI (beam indication DCI) including a field of at least one of one or more TCI states out of the plurality of TCI states, a serving cell index, an HARQ timing indicator (PDSCH-to-HARQ timing indicator), a DAI, a TDRA, and a PRI.

The UE may apply the one or more TCI states to a plurality of types (UL/DL) of signals (channels/RSs).

First Embodiment

Embodiment 1-1

The UE may distinguish between the DCI format with DL assignment (for example, DCI format 1_1/1_2) and the DCI format without DL assignment (for example, DCI format 1_1/1_2) in accordance with at least one of the following distinguishing methods 1 to 3.

In the following embodiments 1-1 to 1-3, when a certain DCI format is indicated as the DCI format without DL assignment, the UE may determine that the DCI format is without DL assignment. In other words, when the DCI format is indicated as the DCI format without DL assignment, the UE may determine that the PDSCH is not scheduled in the DCI format. When the UE determines that the PDSCH is not scheduled in the DCI format, the UE may be indicated with a purpose of other than scheduling the PDSCH in at least one field for scheduling the PDSCH.

The UE may be indicated with the common TCI state, using the DCI format with DL assignment or the DCI format without DL assignment.

In order not to increase the number of blind detections in the UE, the DCI format with DL assignment and the DCI format without DL assignment may have the same payload (size).

[Distinguishing Method 1]

The UE may determine whether a DCI format is the DCI format with DL assignment or the DCI format without DL assignment, based on an RNTI used for CRC scrambling of the DCI format.

An RNTI (a new RNTI, for example, a beam indication RNTI) used for CRC scrambling of the DCI format without DL assignment may be configured. If the UE is configured with monitoring of a new DCI format, the UE may attempt blind detection of the DCI format having a CRC scrambled with the new RNTI.

[Distinguishing Method 2]

The UE may determine whether a DCI format is the DCI format with DL assignment or the DCI format without DL assignment, based on a field included in the DCI format.

When a specific field is included in the DCI format, the UE may determine that the DCI format is the DCI format without DL assignment.

The specific field for indicating the DCI format with DL assignment or the DCI format without DL assignment may be introduced in an existing DCI format (for example, DCI format 1_1/1_2) (defined in Rel. 16 or earlier versions).

The specific field for indicating the DCI format without DL assignment may be introduced in an existing DCI format (for example, DCI format 1_1/1_2) (defined in Rel. 16 or earlier versions). In this case, in order to make the payloads of the DCI format without DL assignment and the DCI format with DL assignment equal to each other, fields other than the specific field included in the existing DCI format need not be included.

If the UE is configured with monitoring of the DCI format without DL assignment and receives the DCI format without DL assignment including the specific field, a common beam may be indicated in the DCI format. An RNTI for scrambling the CRC of the DCI format may be the same as the RNTI (for example, a C-RNTI) for scrambling the CRC of the existing DCI format, or may be a different RNTI (for example, a new RNTI, a beam indication RNTI).

[Distinguishing Method 3]

The UE may determine whether a DCI format is the DCI format with DL assignment or the DCI format without DL assignment, based on a combination of values (special values) of a plurality of DCI fields included in the existing DCI format (for example, DCI format 1_1/1_2) (defined in Rel. 16 or earlier versions). The combination of special values may be a combination described in at least one of the following distinguishing methods 3-1 and 3-2.

The UE may check/verify the following states 1 to 3 for the beam indication DCI.

[State 1]: A CRC of a corresponding DCI format is scrambled using a CS-RNTI provided by a cs-RNTI.

[State 2]: A new data indicator (NDI) field in the DCI format for an enabled transport block is set to '0'.

[State 3]: If there is a DFI flag in the DCI format, a DFI flag field is set to '0'.

When the CRC of the DCI format is scrambled using a CS-RNTI, the UE can determine that the DCI format is at least not a DCI format (a DCI format having a CRC scrambled with a C-RNTI or an MCS-C-RNTI) indicating dormancy of the SCell without DL assignment.

When a value of the NDI field included in the DCI format is set to 0, the UE can determine that the DCI format is at least not a DCI format for retransmission of DL SPS.

[Distinguishing Method 3-1]

The UE may determine whether or not the DCI format is a DCI format for beam indication without DL assignment, based on a combination of values of a first specific field in the DCI format.

The first specific field may be at least one of a redundancy version (RV) field and a modulation and coding scheme (MCS) field. For example, setting the RV field to a special value enables distinguishing from an existing DCI format for DL SPS release. Setting the MCS field to a special value enables distinguishing from an existing DCI format for DL SPS activation.

For example, when the NDI field in the DCI format is configured to 0, the CRC of the DCI format is scrambled using a CS-RNTI, and both of the RV field and the MCS field in the DCI format are all set to a first value (for example, 1) (examples of Opt 1-1 and Opt 2-1 of FIG. 4), the UE may determine that the DCI format is a beam indication DCI format without DL assignment (method 3-1-1).

For example, when the NDI field in the DCI format is configured to 0, the CRC of the DCI format is scrambled using a CS-RNTI, the RV field in the DCI format is all set to the first value (for example, 1), and the MCS field is all set to a second value (for example, 0) (examples of Opt 1-1 and Opt 2-2 of FIG. 4), the UE may determine that the DCI format is a beam indication DCI format without DL assignment (method 3-1-2).

For example, when the NDI field in the DCI format is configured to 0, the CRC of the DCI format is scrambled using a CS-RNTI, and both of the RV field and the MCS field in the DCI format are all set to the second value (for example, 0) (examples of Opt 1-2 and Opt 2-2 of FIG. 4), the UE may determine that the DCI format is a beam indication DCI format without DL assignment (method 3-1-3).

As described above, regarding the DCI format for beam indication without DL assignment, with the NDI field in the DCI format being set to 0, the CRC of the DCI format being scrambled using a CS-RNTI, and the RV field in the DCI format being set to the first value (for example, 1), for example, at least one/a part of the MCS field, the HPN field, and the FDRA field in the DCI format can be made unused (used for another purpose).

[Distinguishing Method 3-2]

In addition to distinguishing method 3-1 above, the UE may determine whether or not the DCI format is a DCI format for beam indication without DL assignment, based on a combination of values of a second specific field in the DCI format.

The second specific field may be at least one of an HARQ process number (HPN) field, an antenna port (s) field, and a DMRS sequence initialization field. For example, setting the HPN field to a special value enables distinguishing from existing DL SPS activation DCI format and DL SPS release DCI format.

For example, when the first specific field is the special value described in distinguishing method 3-1 above, the NDI field in the DCI format is configured to 0, the CRC of the DCI format is scrambled using a CS-RNTI, and the HPN field in the DCI format is set to Unused (Opt 3-1 of FIG. 5), the UE may determine that the DCI format is a beam indication DCI format without DL assignment (method 3-2-1).

For example, when the first specific field is the special value described in distinguishing method 3-1 above, the NDI field in the DCI format is configured to 0, the CRC of the DCI format is scrambled using a CS-RNTI, and the HPN field in the DCI format is all set to the second value (for example, 0) for one DL SPS release (Opt 3-2 of FIG. 5), the UE may determine that the DCI format is a beam indication DCI format without DL assignment (method 3-2-2).

For example, when the first specific field is the special value described in distinguishing method 3-1 above, the NDI field in the DCI format is configured to 0, the CRC of the DCI format is scrambled using a CS-RNTI, and the HPN field in the DCI format is all set to the first value (for example, 1) for one DL SPS release (Opt 3-3 of FIG. 5), the UE may determine that the DCI format is a beam indication DCI format without DL assignment (method 3-2-3).

According to these, even when the RV field in the DCI format is all set to 0, distinguishing from the DCI format for DL SPS activation/release without DL assignment can be performed.

Note that, in at least one of distinguishing methods 3-1 and 3-2 above, a value of a third specific field in the beam indication DCI format without DL assignment may be set to a combination of specific values.

The third specific field may be a frequency domain resource assignment (FDRA) field. Setting the FDRA field to a special value enables distinguishing from existing DL SPS retransmission DCI format and DL SPS activation DCI format.

For example, the value of the third specific field in the beam indication DCI format without DL assignment may be all set to the second value (for example, 0) for FDRA type 0. The value of the third specific field in the beam indication DCI format without DL assignment may be all set to the first value (for example, 1) for FDRA type 1. The value of the third specific field in the beam indication DCI format without DL assignment may be all set to the second value (for example, 0) for dynamic switch.

Embodiment 1-2

In indication of the joint common TCI state, the UE may be indicated with a UL/DL common TCI state in the TCI state field in the DCI format without DL assignment. In the present disclosure, a UL/DL common TCI state, a TCI state common to the UL and the DL, and a joint TCI state may be interchangeably interpreted as each other.

In indication of a separate common TCI state, the UE may be indicated with a DL common TCI state in the TCI state field in the DCI format without DL assignment. In this case, the UE may be indicated with a UL common TCI state in a specific field included in the DCI format.

The specific field may be an unused field in the DCI format. The "unused field" may be a field to be used for DL assignment. When the UE is indicated with the UL common TCI state in the unused field in the DCI format, a name of the field need not be changed, or may be changed to a name (for example, a UL common TCI field) of a field for indicating the UL common TCI state.

The specific field may have the same size (number of bits) as the field for indicating the DL common TCI state. In a case of using the DCI format (for example, DCI format 1_2) for changing the TCI state field using higher layer signaling (RRC signaling), the size of the specific field in the DCI format may be changed (may be variable), based on the size of the field for indicating the DL common TCI state.

The specific field may have a size (number of bits) different from the field for indicating the DL common TCI state. For example, the specific field may have a size (number of bits) larger/smaller than the field for indicating the DL common TCI state. In a case of using the DCI format (for example, DCI format 1_2) for changing the TCI state field using higher layer signaling (RRC signaling), the size (number of bits) of the specific field in the DCI format may be changed (may be variable), based on a specific higher layer parameter. The specific higher layer parameter may be a parameter different from a parameter related to the DL TCI state.

Figure 6A:
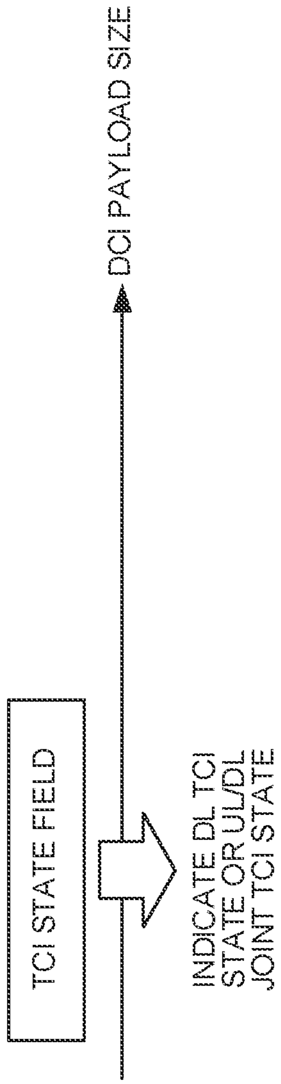
FIG. 6A and FIG. 6B are diagrams to show examples of field(s) for indicating TCI state(s) according to embodiment 1-2.

FIG. 6A is a diagram to show an example of a field for indicating the TCI state according to embodiment 1-2. In the example shown in FIG. 6A, the UE is indicated with the DL TCI state or the UL/DL common TCI state in the TCI state field in the DCI format.

Figure 6B:
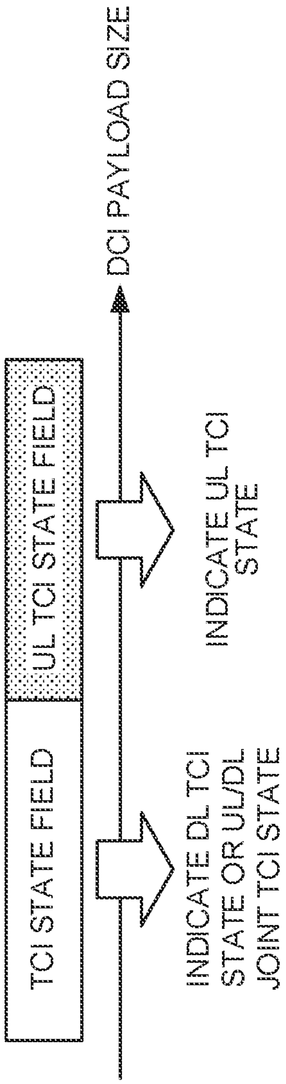

FIG. 6B is a diagram to show another example of fields for indicating the TCI states according to embodiment 1-2. In the example shown in FIG. 6B, the UE is indicated with the DL common TCI state (or the UL/DL common TCI state) in the TCI state field in the DCI format, and is indicated with the UL common TCI state in a specific field (UL TCI state field) in the DCI format.

According to the first embodiment described above, distinguishing between the DCI format without DL assignment and the DCI format with DL assignment and beam indication using the DCI format without DL assignment can be appropriately performed.

Second Embodiment

In a unified TCI state framework of Rel. 17 or later versions, when the beam indication DCI format without DL assignment (for example, DCI format 1_1/1_2) is supported, the UE may apply a method of generating/transmitting at least one of the type 1 HARQ-ACK codebook and the type 2 HARQ-ACK codebook defined in Rel. 16 or earlier versions to transmission of the HARQ-ACK for the DCI format.

When the UE succeeds in reception processing (for example, demodulation/decoding) of the beam indication DCI format without DL assignment, the UE may transmit a positive response (ACK).

When the UE fails in the reception processing of the beam indication DCI format without DL assignment, the UE may transmit a negative response (NACK), or need not transmit a negative response (NACK).

For example, in the type 1 (semi-static) HARQ-ACK codebook, when the UE fails in the reception processing of the beam indication DCI format without DL assignment, the UE may transmit a negative response (NACK).

For example, in the type 2 (dynamic) HARQ-ACK codebook, when the UE fails in the reception processing of the beam indication DCI format without DL assignment, the UE need not transmit a negative response (NACK).

For example, in a case of the type 1 HARQ-ACK codebook, the UE may determine the position of the ACK information in the HARQ-ACK codebook, based on a time domain assignment list configured for the PDSCH for a virtual PDSCH (a (Dummy) PDSCH not actually transmitted) that is indicated in the TDRA field in the beam indication DCI format.

For example, in a case of the type 1 HARQ-ACK codebook, the UE may determine the position of the ACK information in the HARQ-ACK codebook in accordance with the same rule as that in a case of the DL SPS release DCI format.

For example, in a case of the type 2 HARQ-ACK codebook, the UE may determine the position of the ACK information in the HARQ-ACK codebook, based on a time domain assignment list configured for the PDSCH for a virtual PDSCH (a (Dummy) PDSCH not actually transmitted) that is indicated in the TDRA field in the beam indication DCI format.

For example, in a case of the type 2 HARQ-ACK codebook, the UE may determine the position of the ACK information in the HARQ-ACK codebook in accordance with the same rule as that in a case of the DL SPS release DCI format.

The UE may transmit the ACK information in a PUCCH transmission occasion after specific timing (for example, k slots) has passed since the end of reception of the PDCCH (DCI). The specific timing (for example, k) may be indicated in a specific field (for example, a PDSCH-to-HARQ feedback timing indicator field) in the DCI. When the specific field (for example, the PDSCH-to-HARQ feedback timing indicator field) is not included in the DCI, the specific timing (for example, k) may be provided by a specific higher layer parameter (for example, dl-DataToUL-ACK or dl-DataToUL-ACK-ForDCI-Format1-2-r16).

Figure 7A:
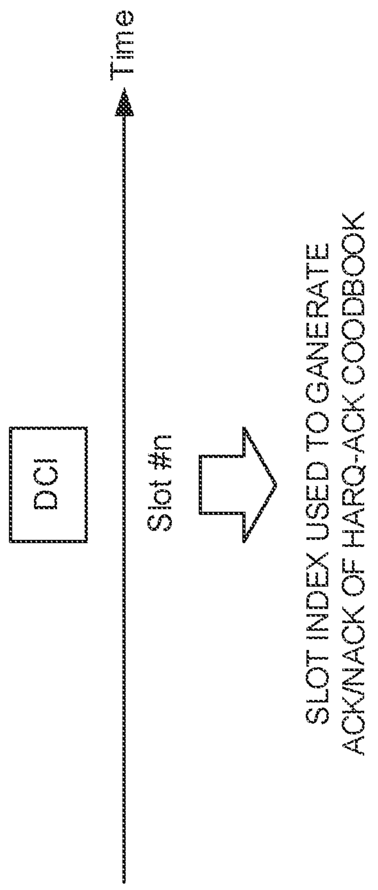
FIG. 7A and FIG. 7B are diagrams to show examples of a method of generating an HARQ-ACK for beam indication DCI according to a second embodiment.

FIG. 7A is a diagram to show an example of a method of generating the HARQ-ACK for the beam indication DCI according to a second embodiment. In the example shown in FIG. 7A, the UE receives the beam indication DCI, and generates an ACK/NACK of the HARQ-ACK codebook for the DCI, based on information (here, a slot index (slot #n)) related to timing (here, a slot) of performing reception of the DCI.

Figure 7B:
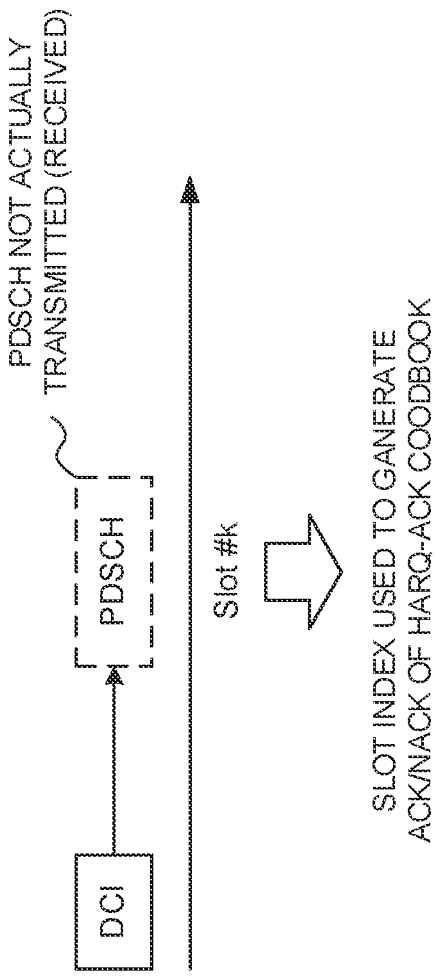

FIG. 7B is a diagram to show another example of a method of generating the HARQ-ACK for the beam indication DCI according to the second embodiment. In the example shown in FIG. 7B, the UE receives the beam indication DCI, and generates an ACK/NACK of the HARQ-ACK codebook for the DCI, based on information (slot index (slot #k)) related to timing (slot) of receiving the PDSCH not actually transmitted for the DCI. Note that timing from reception of DCI to reception of the PDSCH may be configured/indicated by at least one of RRC signaling and the PDSCH-to-HARQ feedback timing indicator field included in the DCI.

According to the second embodiment described above, an ACK/NACK for the beam indication DCI without DL assignment can be appropriately generated.

Third Embodiment

The UE is indicated with at least one of the DL TCI state and the UL/DL common (joint) TCI state, using the DCI format with DL assignment (for example, DCI format 1_1/1_2) defined in Rel. 16 or earlier versions.

The UE may be indicated with at least one of a plurality of DL TCI states, a plurality of UL TCI states, and a plurality of UL/DL common (joint) TCI states, using the DCI format without DL assignment (for example, DCI format 1_1/1_2). When the UE receives the DCI format without DL assignment (for example, DCI format 1_1/1_2), the UE may be indicated with at least one of a plurality of DL TCI states, a plurality of UL TCI states, and a plurality of UL/DL common (joint) TCI states, using at least one field for scheduling the PDSCH.

This is suitable for configuration/indication of the TCI state for each TRP in a case of using a plurality of TRPs, for example. The DL TCI state (or the UL/DL common (joint) TCI state) and the UL TCI state corresponding to the same TRP may be referred to as a set of TCI states corresponding to the same TRP.

In indication of the TCI state in intra-band carrier aggregation (CA)/inter-band CA, the same TCI state may be applied to a part of CCs out of a plurality (for example, all) of CCs. When at least one of a plurality of DL TCI states, a plurality of UL TCI states, and a plurality of UL/DL common (joint) TCI states is indicated for the UE, a first TCI state may be configured for/assigned to a part of CCs out of the plurality (for example, all) of CCs, and a second TCI state may be configured for/assigned to the other part of CCs. According to this, the TCI states of a plurality of different CCs can be simultaneously updated/changed/configured using one TCI state indication.

In this case, the UE may be indicated with one or more DL TCI states/one or more UL/DL TCI states in a TCI state field defined in Rel. 16 or earlier versions in the DCI format (for example, DCI format 1_1/1_2). The UE may be indicated with one or more DL TCI states/one or more UL TCI states/one or more UL/DL TCI states in an unused field in the DCI format (for example, DCI format 1_1/1_2).

At least one of the number of TCI states indicated by the DCI format without DL assignment (for example, DCI format 1_1/1_2), the number of fields for indicating the TCI state, and information as to which TCI state field is to be added may be configured for/notified to the UE via higher layer signaling (for example, RRC signaling).

Figures 8A, 8B, 8C:
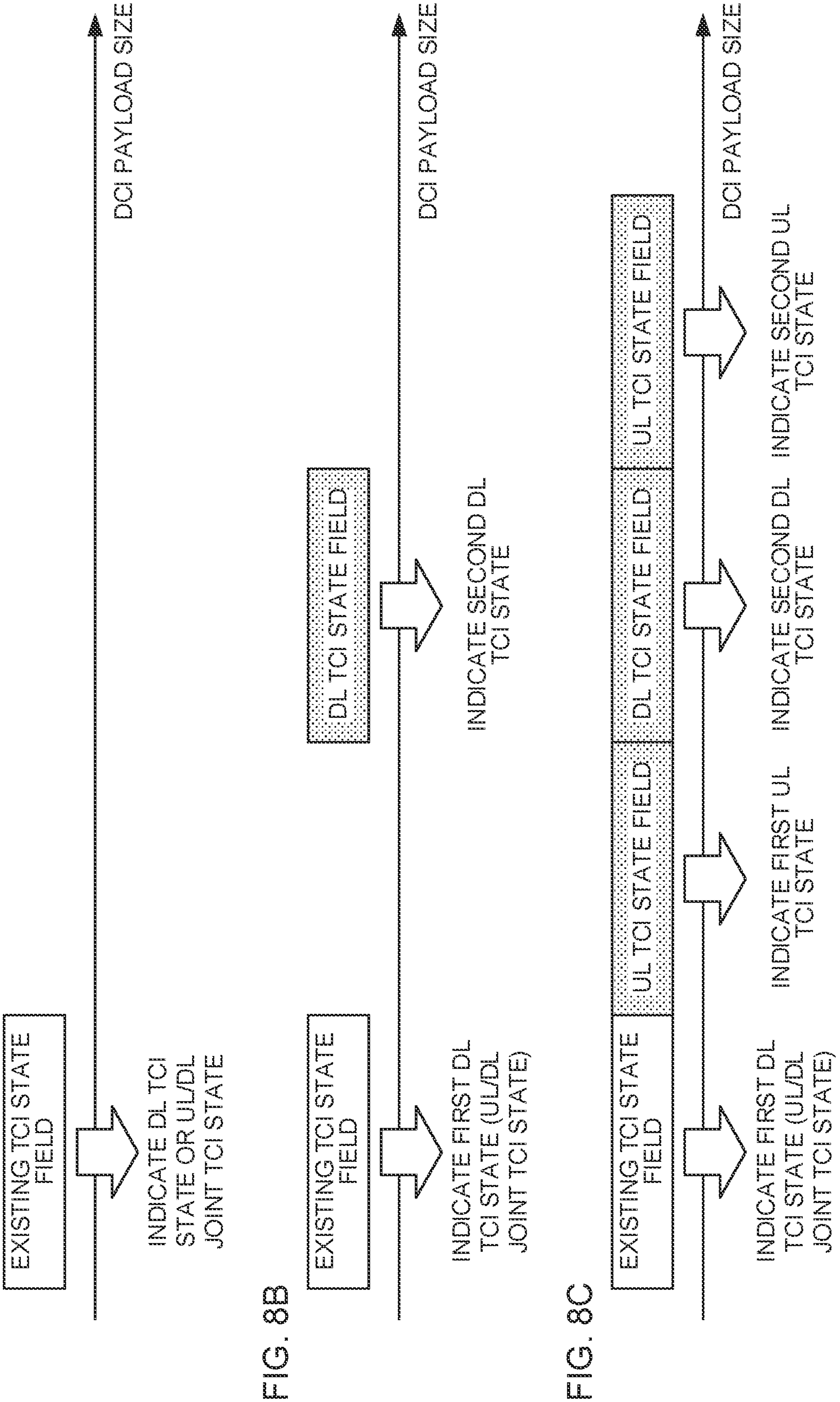
FIG. 8A to FIG. 8C are diagrams to show examples of indication of TCI state(s) using a DCI format according to a third embodiment.

FIG. 8A is a diagram to show an example of indication of the TCI state using an existing DCI format. In the example shown in FIG. 8A, a case may be considered in which a single TCI state for a single TRP is indicated. In the example shown in FIG. 8A, the UE is indicated with the DL TCI state (or the UL/DL common (joint) TCI state) in the TCI state field in the DCI format.

FIG. 8B is a diagram to show an example of indication of the TCI states using a DCI format without DL assignment. In the example shown in FIG. 8B, a case may be considered in which two joint TCI states for two TRPs are indicated. In the example shown in FIG. 8B, the UE is indicated with a first DL TCI state (or a first UL/DL common (joint) TCI state) in an existing TCI state field in the DCI format. The UE is indicated with a second DL TCI state (or a second UL/DL common (joint) TCI state), using an unused field in the DCI format. The UE may apply the indicated TCI states to respective corresponding TRPs.

FIG. 8C is a diagram to show another example of indication of the TCI states using a DCI format without DL assignment. In the example shown in FIG. 8C, a case may be considered in which two separate TCI states for two TRPs are indicated. In the example shown in FIG. 8C, the UE is indicated with the first DL TCI state in an existing TCI state field in the DCI format. The UE is indicated with the first UL TCI state, the second DL TCI state, and a second UL TCI state, using an unused field in the DCI format. The first DL TCI state and the first UL TCI state may be referred to as a first TCI state, and may correspond to a first TRP. The second DL TCI state and the second UL TCI state may be referred to as a second TCI state, and may correspond to a second TRP. The UE may apply the indicated TCI states to respective corresponding TRPs.

Note that the examples shown in FIG. 8A to FIG. 8C describe a case in which the number of TRPs is two (a case in which the number of sets of TCI states is two), but the number is not limited to this. In a case of the separate TCI state, the number of DL TCI states and the number of UL TCI states configured/indicated for the UE may be the same or different.

The size (number of bits) of the field for indicating each TCI state may be changed based on the number of sets of TCI states. The UE may assume that the size (number of bits) of the field for indicating each TCI state is variable, based on the number of sets of TCI states.

Note that, in the present disclosure, the field for indicating each TCI state may include an existing TCI state field and an unused field in the DCI format.

Figure 9A:
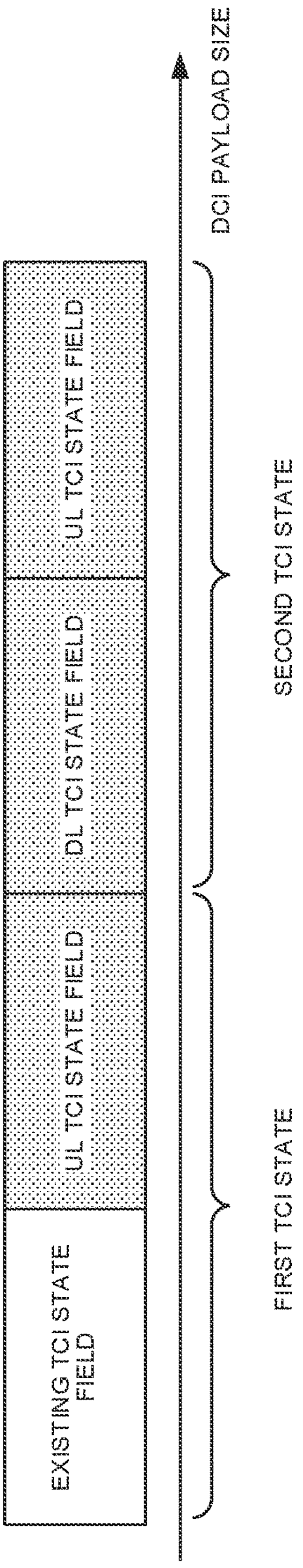
FIG. 9A and FIG. 9B are diagrams to show examples of a size of fields for indicating TCI states according to the third embodiment.

FIG. 9A is a diagram to show an example of the size of the fields for indicating the TCI states according to a third embodiment. In FIG. 9A, the UE is indicated with two separate TCI states for two TRPs.

Figure 9B:
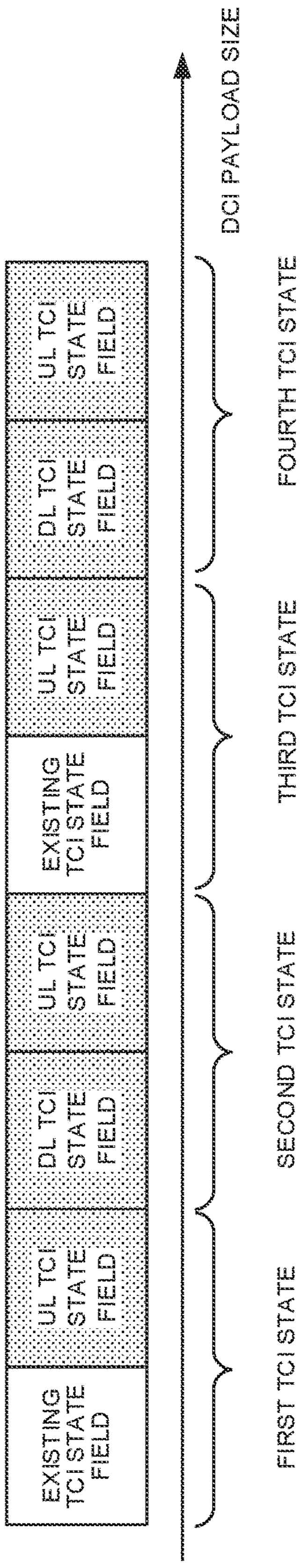

FIG. 9B is a diagram to show another example of the size of the fields for indicating the TCI states according to the third embodiment. In FIG. 9B, the UE is indicated with four separate TCI states for four TRPs. In comparison to FIG. 9A above, the size (number of bits) of each field for indicating the TCI state is reduced.

The UE may be configured with/notified of the number of bits of each field for indicating the TCI state via higher layer signaling.

The number of bits (DCI size) of each TCI state field may be defined based on the number (N) of UL TCI states and the number (M) of DL TCI states. An association (list/table) of the number (N) of UL TCI states, the number (M) of DL TCI states, and the number of bits (DCI size) of each TCI state field may be defined.

For example, the association may be separately defined for the indication of the joint TCI state and the indication of the separate TCI state (see FIG. 10). According to this, a case in which different numbers of TCI state fields are required for the indication of the joint TCI state and the indication of the separate TCI state can be supported. Note that, in the indication of the separate TCI state, N and M may be different, and the size of the TCI state field may be different between the UL TCI state and the DL TCI state.

The payload (size) of the DCI format may be changed based on whether or not the number of bits of the unused field in the DCI format is insufficient for the number of fields for indicating necessary TCI states.

Figure 11:
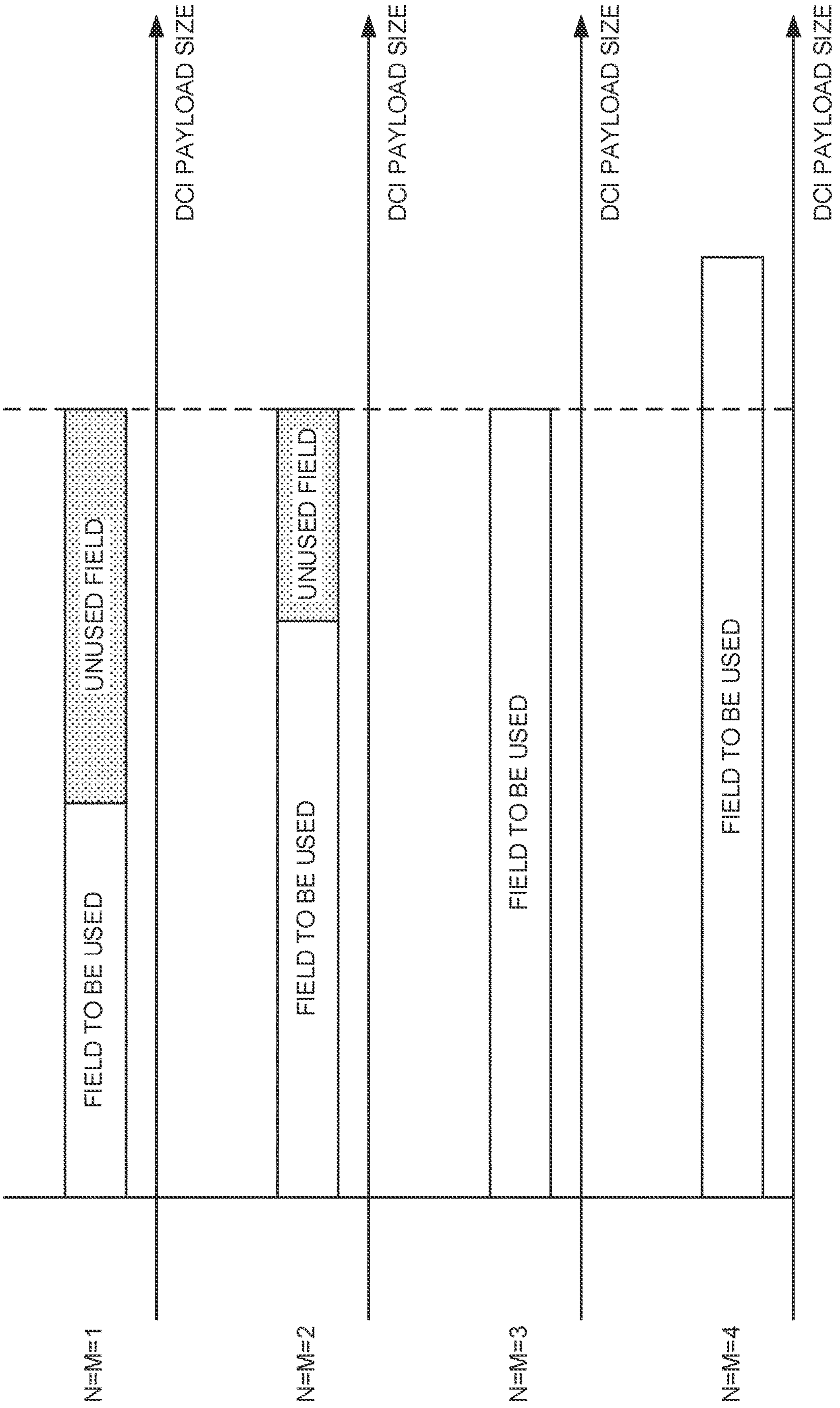
FIG. 11 is a diagram to show payloads of DCI formats according to the third embodiment.

FIG. 11 is a diagram to show payloads of the DCI formats according to the third embodiment. In the example shown in FIG. 11, a field to be used for indication of the TCI state (field to be used) and an unused field (field not even used for indication of the TCI state) are included in the DCI format. For example, when the number (N) of UL TCI states=the number (M) of DL TCI states=1, N=M=2, or N=M=3, the size of the field to be used in the DCI format does not exceed a payload (size) of specific DCI.

In contrast, when N=M=4, the size of the field to be used in the DCI format exceeds the payload (size) of the specific DCI. In this case, the size of the DCI format may be changed/configured to exceed the payload of the specific DCI. By using a UE-specific DCI format (for example, DCI format 1_1/1_2), the payload of the DCI can be controlled as described above.

Note that the number of UL TCI states, the number of DL TCI states, the size of the field to be used in the DCI format, each of the conditions, and the like shown in FIG. 11 are merely examples and are not limited to these.

According to the third embodiment described above, even when a plurality of TCI states are indicated, indication of the TCI states can be appropriately performed.

Fourth Embodiment

A higher layer parameter (RRC information element)/UE capability corresponding to at least one function (characteristic, feature) in the first to third embodiments may be defined. The UE capability may indicate support of the function.

The UE configured with the higher layer parameter corresponding to the function may perform the function. "The UE not configured with the higher layer parameter corresponding to the function does not perform the function" may be defined.

The UE that has reported the UE capability indicating support of the function may perform the function. "The UE that does not report the UE capability indicating support of the function does not perform the function" may be defined.

When the UE reports the UE capability indicating support of the function, and is configured with the higher layer parameter corresponding to the function, the UE may perform the function. "When the UE does not report the UE capability indicating the support of the function, or is not configured with the higher layer parameter corresponding to the function, the UE does not perform the function" may be defined.

The function may be common beam indication/separate beam indication.

The UE capability may indicate the number (maximum number) of TCI states configured by RRC for common beam indication supported by the UE. The TCI state may include at least one of the TCI state for common beam indication, the UL TCI state for separate beam indication, and the DL TCI state for separate beam indication.

The UE capability may indicate number (maximum number) of active TCI states for common beam indication supported by the UE. The TCI state may include at least one of the TCI state for common beam indication, the UL TCI state for separate beam indication, and the DL TCI state for separate beam indication.

The UE capability may indicate whether different (separate) active TCI state pools respectively for the UL and the DL are supported or the joint/same TCI pool for the UL and the DL is supported.

The UE capability may indicate whether the UE supports reception of the beam indication DCI format without DL assignment.

According to the present embodiment, the UE can implement the functions described above while maintaining compatibility with existing specifications.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 12:
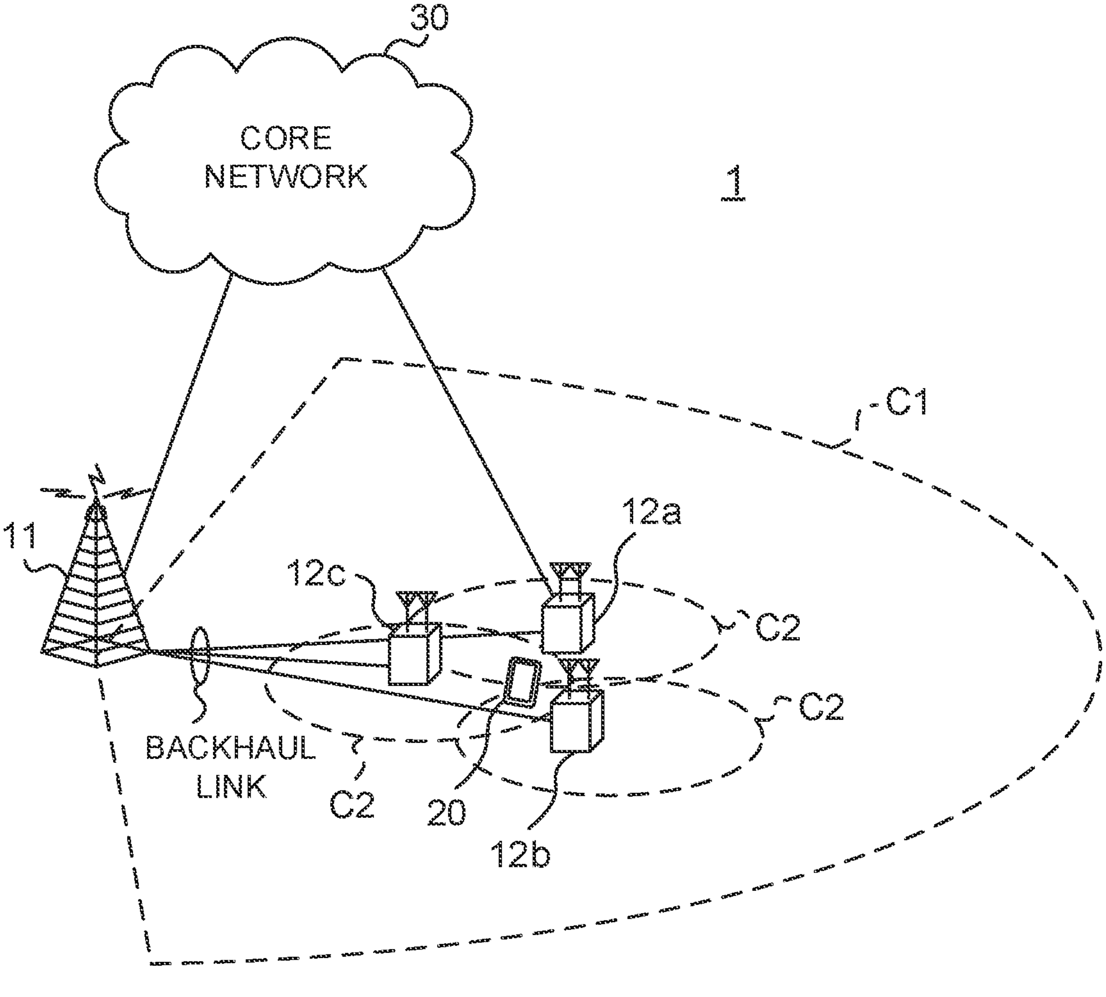
FIG. 12 is a diagram to show an example of a schematic structure of a radio communication system according to one embodiment.

FIG. 12 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHZ), and FR2 may be a frequency band which is higher than 24 GHZ (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 13:
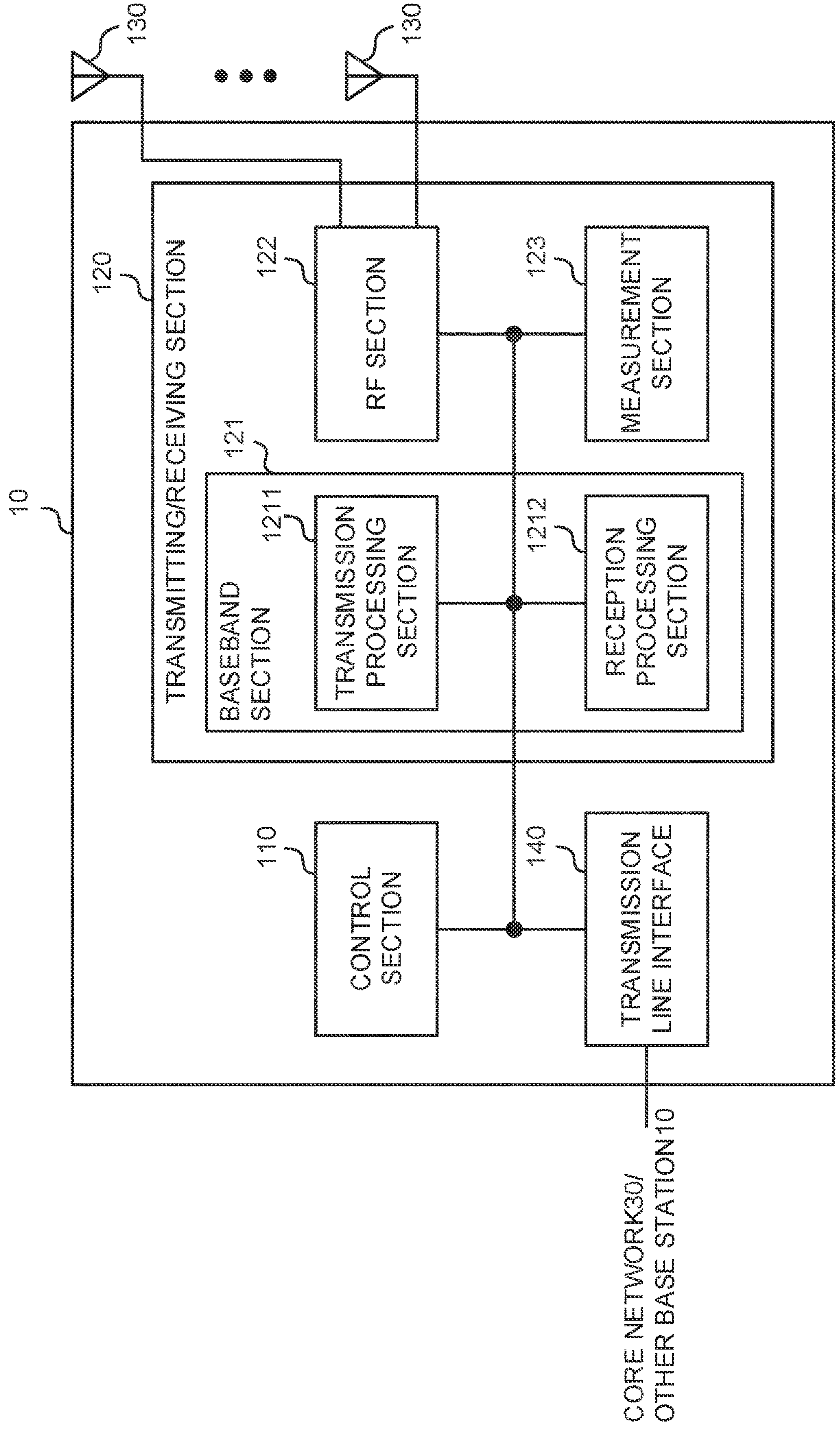
FIG. 13 is a diagram to show an example of a structure of a base station according to one embodiment.

FIG. 13 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit information indicating a plurality of transmission configuration indication (TCI) states, and transmit downlink control information (DCI) indicating one or more TCI states out of the plurality of TCI states. The control section 110 may indicate whether the DCI is DCI not indicating scheduling of a physical downlink shared channel nor a physical uplink shared channel, using values of a plurality of specific fields included in the DCI, and apply the one or more TCI states to a plurality of types of signals (first embodiment).

(User Terminal)

Figure 14:
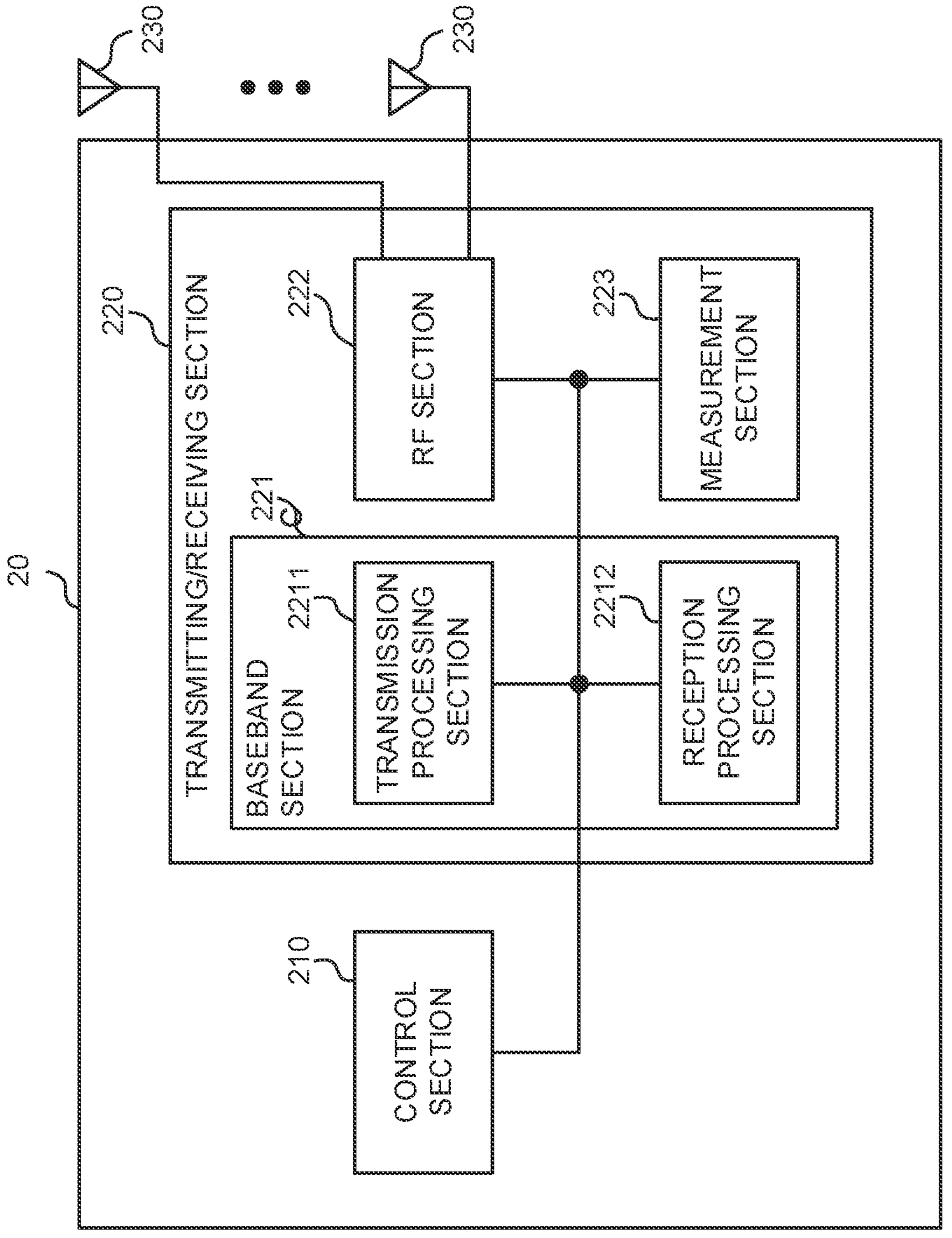
FIG. 14 is a diagram to show an example of a structure of a user terminal according to one embodiment.

FIG. 14 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive information indicating a plurality of transmission configuration indication (TCI) states, and receive downlink control information (DCI) indicating one or more TCI states out of the plurality of TCI states. The control section 210 may determine whether the DCI is DCI not indicating scheduling of a physical downlink shared channel nor a physical uplink shared channel, based on values of a plurality of specific fields included in the DCI, and apply the one or more TCI states to a plurality of types of signals (first embodiment).

The plurality of specific fields may be at least two of a redundancy version field, a modulation and coding scheme field, an HARQ (hybrid automatic repeat request acknowledgement) process number field, an antenna port field, and a demodulation reference signal sequence initialization field (first embodiment).

A payload size of a format of the DCI may be equal to the payload size of the format of the DCI indicating scheduling of the physical downlink shared channel (first embodiment).

The control section 210 may control generation of HARQ-ACK information for the DCI, based on at least one of information related to timing of receiving the DCI and information related to timing of receiving the physical downlink shared channel included in the DCI (second embodiment).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 15:
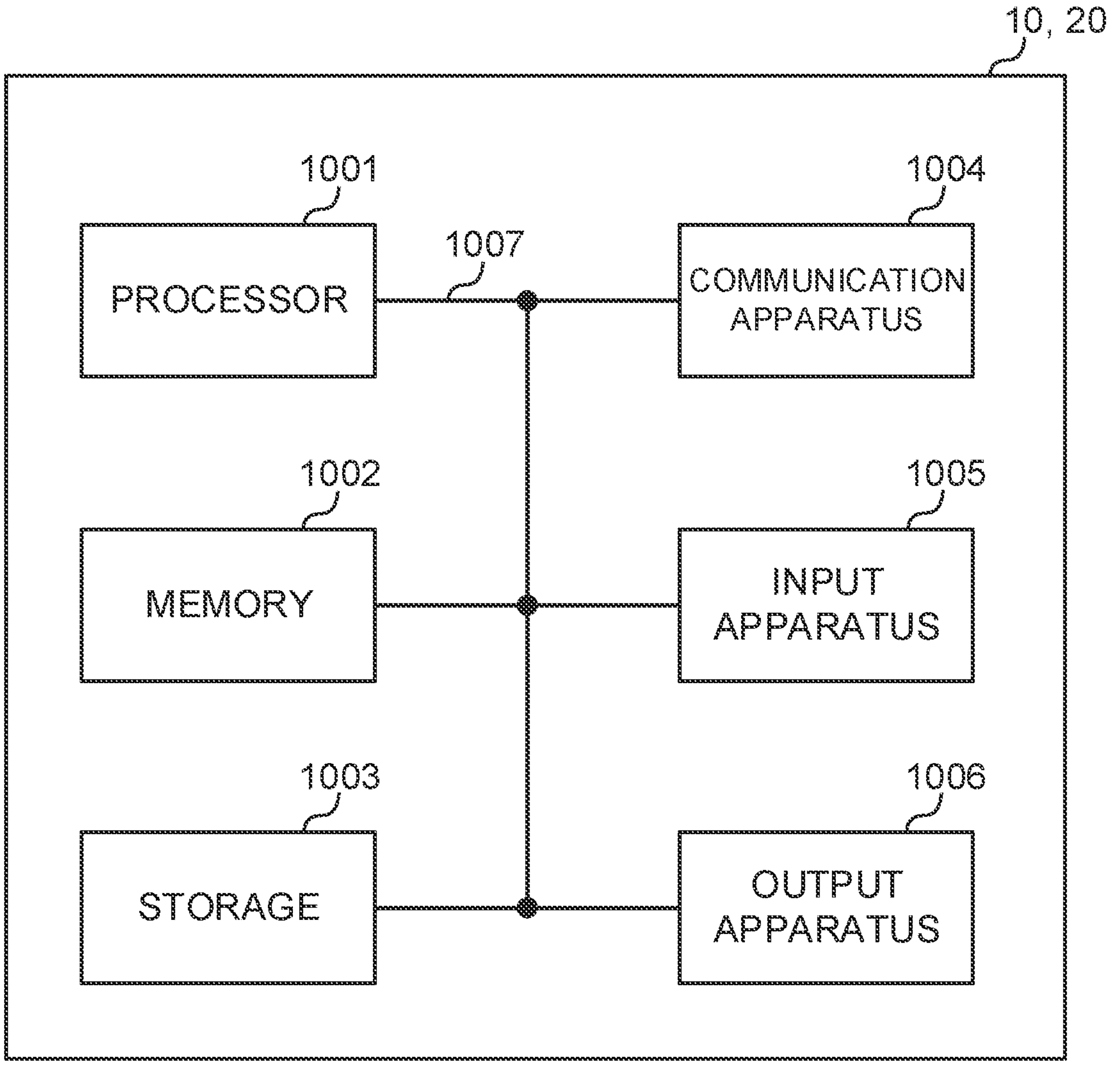
FIG. 15 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 15 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal,"

"wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words such as "uplink" and "downlink" may be interpreted as the words corresponding to the terminal-to-terminal communication (for example, "sidelink"). For example, an uplink channel, a downlink channel and so on may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:

a receiver that receives information indicating multiple transmission configuration indication (TCI) states applicable to multiple types of channels, and receives downlink control information (DCI) indicating one or more TCI states among the multiple TCI states; and a processor that determines, based on values of multiple specific fields included in the DCI, whether the DCI is DCI without downlink (DL) assignment, wherein a payload size of a format of the DCI is equal to a payload size of a format of DCI with DL assignment, and wherein when a radio network temporary identifier (RNTI) used for the DCI is a CS-RNTI and, in the DCI, when values of a redundancy version (RV) field are all 1, values of a modulation and coding scheme (MCS) field are all 1, a value of a new data indicator (NDI) field is 0, and values of a frequency domain resource assignment (FDRA) field are all 0 for type 0 or all 1 for type 1, the processor determines that the DCI is the DCI without DL assignment.

2. The terminal according to claim 1, wherein when the DCI is the DCI without DL assignment and reception processing of the DCI is successfully performed, the processor controls to transmit a positive response (ACK).

3. The terminal according to claim 1, wherein the processor controls to transmit the positive response to the DCI, after a period indicated by a specific field included in the DCI is elapsed from end of reception of the DCI.

4. A radio communication method for a terminal, comprising:

receiving information indicating multiple transmission configuration indication (TCI) states applicable to multiple types of channels;

receiving downlink control information (DCI) indicating one or more TCI states among the multiple TCI states; and determining, based on values of multiple specific fields included in the DCI, whether the DCI is DCI without downlink (DL) assignment, wherein a payload size of a format of the DCI is equal to a payload size of a format of DCI with DL assignment, and wherein when a radio network temporary identifier (RNTI) used for the DCI is a CS-RNTI and, in the DCI, when values of a redundancy version (RV) field are all 1, values of a modulation and coding scheme (MCS) field are all 1, a value of a new data indicator (NDI) field is 0, and values of a frequency domain resource assignment (FDRA) field are all 0 for type 0 or all 1 for type 1, the DCI is determined to be the DCI without DL assignment.

5. A base station comprising:

a transmitter that transmits information indicating multiple transmission configuration indication (TCI) states applicable to multiple types of channels, and transmits downlink control information (DCI) indicating one or more TCI states among the multiple TCI states; and a processor that indicates, using values of multiple specific fields included in the DCI, whether the DCI is DCI without downlink (DL) assignment, wherein a payload size of a format of the DCI is equal to a payload size of a format of DCI with DL assignment, and wherein when a radio network temporary identifier (RNTI) used for the DCI is a CS-RNTI and, in the DCI, when values of a redundancy version (RV) field are all 1, values of a modulation and coding scheme (MCS) field are all 1, a value of a new data indicator (NDI) field is 0, and values of a frequency domain resource assignment (FDRA) field are all 0 for type 0 or all 1 for type 1, the processor determines that the DCI is the DCI without DL assignment.

6. A system comprising a base station and a terminal, wherein the base station comprises:

a transmitter that transmits information indicating multiple transmission configuration indication (TCI) states applicable to multiple types of channels, and transmits downlink control information (DCI) indicating one or more TCI states among the multiple TCI states, and the terminal comprises:

a receiver that receives the information and the DCI; and a processor that determines, based on values of multiple specific fields included in the DCI, whether the DCI is DCI without downlink (DL) assignment, wherein a payload size of a format of the DCI is equal to a payload size of a format of DCI with DL assignment, and wherein when a radio network temporary identifier (RNTI) used for the DCI is a CS-RNTI and, in the DCI, when values of a redundancy version (RV) field are all 1, values of a modulation and coding scheme (MCS) field are all 1, a value of a new data indicator (NDI) field is 0, and values of a frequency domain resource assignment (FDRA) field are all 0 for type 0 or all 1 for type 1, the processor determines that the DCI is the DCI without DL assignment.

* * * * *